(12) United States Patent
Furuya et al.

(10) Patent No.: US 7,939,160 B2
(45) Date of Patent: May 10, 2011

(54) ANTIGLARE FILM AND IMAGE DISPLAY

(75) Inventors: Tsutomu Furuya, Niihama (JP); Masato Kuwabara, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 944 days.

(21) Appl. No.: 11/633,092

(22) Filed: Dec. 4, 2006

(65) Prior Publication Data
US 2007/0139783 A1    Jun. 21, 2007

(30) Foreign Application Priority Data

Dec. 6, 2005 (JP) ................................ 2005-351617

(51) Int. Cl.
*B32B 3/26* (2006.01)
*G02B 5/02* (2006.01)

(52) U.S. Cl. ........................................ 428/141; 359/601
(58) Field of Classification Search .................. 428/141; 359/601
See application file for complete search history.

(56) References Cited

U.S. PATENT DOCUMENTS

| 2002/0122257 A1 | 9/2002 | Suga et al. |
| 2002/0163726 A1 | 11/2002 | Masaki et al. |
| 2004/0209113 A1 | 10/2004 | Kuwabara et al. |

FOREIGN PATENT DOCUMENTS

| JP | 6-34961 | 2/1994 |
| JP | 2002-189106 | 7/2002 |
| JP | 2002-236203 | 8/2002 |
| JP | 2003-211457 | 7/2003 |
| JP | 2004-4176 | 1/2004 |
| JP | 2004-45471 | 2/2004 |
| JP | 2004-45472 | 2/2004 |
| JP | 2004-90187 | 3/2004 |
| JP | 2004-240411 | 8/2004 |
| JP | 2005-92197 | 4/2005 |
| JP | 2005-140890 | 6/2005 |
| JP | 2005-227407 | 8/2005 |
| JP | 2006-53371 | 2/2006 |

OTHER PUBLICATIONS

English Translation of the Office Action received in the corresponding Chinese patent application 200610064385.2, dated Dec. 11, 2009. (7 pgs.).

*Primary Examiner* — William P Watkins, III
(74) *Attorney, Agent, or Firm* — Foley & Lardner LLP

(57) ABSTRACT

The present invention provides an antiglare film having the reflectance at an angle of reflection of 30° for incident light 13 at an incident angle of 30° of not more than 2%, and the reflectance of not more than 0.003% at an angle of reflection of 40° in an antiglare film which also satisfies any of the following (1) to (5): (1) 50 to 150 protrusions are provided within a region of 200 μm×200 μm; (2) when the height of each point on the uneven surface is shown in a histogram, the peak exists in a range between +20% and −20% with the middle point between the highest point and the lowest point at the center; (3) the arithmetic average height Pa on the surface is 0.08 μm to 0.15 μm; (4) the maximum height in a cross section Pt on the surface is 0.4 μm to 0.9 μm; and (5) the average area of the polygons is 300 μm² to 1000 μm² when Voronoi division is carried out on the surface of the film with the peaks of these protrusions as generating points.

7 Claims, 11 Drawing Sheets

ANTIGLARE FILM AND IMAGE DISPLAY

BACKGROUND OF THE INVENTION

1. Technical Field

The present invention relates to an antiglare film having little haze and excellent antiglare properties, as well as an image display with such an antiglare film.

2. Background of the Invention

Visibility of image displays, such as liquid crystal displays, plasma displays, Braun tube (cathode ray tube: CRT) displays and organic electroluminescence (EL) displays is significantly deteriorated when external light is reflected from the display surface. In order to reduce such reflection of external light, a layer for reducing reflection of external light is laminated on the surface of conventional image displays, such as those of television sets and personal computers, of which the image quality is important, video cameras and digital cameras used outdoors, where external light is strong, and cellular phones, which display using reflected light. The layer can be generally categorized into two kinds, such as one on which an anti-reflection is carried out using the interference in optical multilayer films, and the other on which an anti-glare process for scattering incident light so that reflected images fade is carried out by creating microscopic unevenness on the surface. From among these, it is necessary to form a multilayer film having a uniform optical film thickness in the former anti-reflection film, and therefore, the cost increases. In contrast, the latter antiglare films can be manufactured at relatively low cost, and therefore, are widely used in applications such as large personal computers and monitors.

Antiglare films as those described above have been manufactured in accordance with a conventional method for creating random unevenness on a sheet by applying a resin solution in which a filler is dispersed to a base sheet so that the filler is exposed from the surface of the applied film through adjustment of the thickness of the applied film. However, the arrangement and form of the unevenness on antiglare films manufactured by dispersing such a filler are influenced by the state of distribution of the filler in the resin solution or the state of application, and therefore, unevenness as intended may not sufficiently performed, and sufficient antiglare performance may not be gained. Furthermore, in the case where such a conventional antiglare film is placed on the surface of an image display, the entirety of the display surface becomes whitish due to scattering of light, causing that the surface becomes of a cloudy color, that is to say, so-called discoloring to white easily occurs. In addition, in the case where an antiglare uneven surface is provided on the outermost surface of an image display with high precision, pixels and unevenness on the antiglare surface sometimes interfere, causing so-called "glaring," and the clarity of the image may be lowered. Such "glaring" lowers the visibility of the displayed image.

Meanwhile, it has been attempted to provide antiglare properties with only microscopic unevenness created on the surface of the transparent resin layer, without a filler. For example, JP2002-189106A (Claims 1 to 6, paragraphs 0043 to 0046) (Patent Document 1) discloses an antiglare film in such a form that an ionizing radiation curing resin layer is provided on a transparent resin film by curing the ionizing radiation curing resin in a state where the ionizing radiation curing resin is sandwiched between the emboss mold and the transparent resin film, so that microscopic unevenness is created, where the average coarseness at ten points in three dimensions and the average distance between adjacent protrusions on the three-dimensional coarseness reference surface respectively have predetermined values.

In addition, JP H6 (1994)-34961A (Claims 1 to 3, paragraph 0024) (Patent Document 2), JP2004-45471A (Claim 4, Embodiment 1) (Patent Document 3) and JP2004-45472A (Claim 4, Embodiment 1) (Patent Document 4), for example, disclose use of a film where microscopic unevenness is created on the surface as a light diffusing layer placed on the back side of a liquid crystal display instead of an antiglare film placed on the display surface of a display.

As a technique for creating unevenness on the surface of a film, the above described Patent Documents 3 and 4 disclose a method where an emboss roll having such a form that protrusions and recesses are inverted is filled with an ionizing radiation curing resin liquid, a transparent base which runs in sync in the direction of rotation of an engraving roll makes contact with the filling resin, the resin between the engraving roll and the transparent base is cured when the transparent base makes contact with the engraving roll, the cured resin and the transparent base are attached to each other at the time of curing, and after that, the layered body of the resin after curing and the transparent base is peeled from the engraving roll.

In this technique, the composition of the ionizing radiation curing resin solution that can be used is restricted, and leveling, such as through application of a liquid distilled with a solvent, may be expected to be insufficient, and therefore, the uniformity of the film thickness may not be sufficient. Furthermore, it is necessary to fill the engraving emboss roll directly with a resin liquid, and therefore, high physical precision is required in the engraving emboss roll in order to secure uniformity on the uneven surface, and thus, it is difficult to fabricate an emboss roll.

Next, the above described Patent Document 2, for example, discloses a method for preparing a cylindrical body using a metal or the like and creating unevenness on the surface of the cylindrical body in accordance with a technique such as electronic sculpting, etching or sandblasting as a method for fabricating a roll used for the fabrication of a film having unevenness on the surface. In addition, JP2004-90187A (Claims 1 and 2) (Patent Document 5) discloses a method for fabricating an emboss roll including steps of forming a metal plating layer on the surface of an emboss roll, polishing the surface of the metal plating layer to a mirror surface, carrying out a blasting process using ceramic beads on the surface of the metal plating layer that has been polished to a mirror surface, and carrying out a peening process if necessary.

In the state where a blasting process has been carried out on the surface of the emboss roll as described above, distribution in the diameter of unevenness corresponds to the distribution in the particle diameter of the blasting particles, and it is difficult to control the depth of recesses gained through blasting, and thus, it may be difficult to gain unevenness in a form which is excellent in antiglare performance with high reproducibility.

In addition, the above-described Patent Document 1 describes the creation of a surface with unevenness in accordance with a sandblasting method or a bead shooting method, preferably using a roller where chromium is plated on the surface of iron. Furthermore, it is described that it is preferable for the mold where unevenness is created on the surface in this manner to be used after chromium is plated on the surface for the purpose of increasing durability at the time of use, and thereby, hardening of the film and prevention of corrosion can be achieved. Meanwhile, the above described Patent Documents 3 and 4 respectively describe Embodiment where the surface of iron is plated with chrome, a liquid sandblasting process of #250 is carried out, and after that, a chrome plating process is again carried out, and thereby, microscopic unevenness is created on the surface.

In this method for fabricating an emboss roll, blasting or shooting is carried out on the chromium plating having a high hardness, and therefore, it is difficult for unevenness to be created, as well as for the form of the created unevenness to be controlled with precision. Furthermore, the surface of the chromium plating generally tends to be coarse, and fine unevenness is created through chromium plating on the unevenness created through blasting, and therefore, it is difficult to design the manner in which unevenness is created. Moreover, the scattering properties in the finally gained antiglare film change in a negative manner due to the fine unevenness created through chromium plating.

Furthermore, JP2005-140890A (Claim 1, paragraph 0056) (Patent Document 6) by the present inventors discloses an antiglare film where the peak position and the half value width thereof satisfy predetermined conditions when regions which are higher than the average height of the unevenness are protrusions and regions which are lower than these are recesses, the frequency of apparent areas found from the projected area of an individual protrusion or recess is shown in a histogram. In this Patent Document, contrast in the front of a liquid crystal display formed by combining an antiglare film with a liquid crystal panel lowers when the haze is high, and therefore, it is preferable for the haze to be not more than 15%.

SUMMARY OF THE INVENTION

The present invention is to provide an antiglare film having excellent antiglare performance even in a state where a low reflection film does not exist on the outermost surface, which sufficiently prevents visibility from lowering due to discoloring to white or glare, and furthermore, to provide an image display to which such an antiglare film is applied.

The present inventors have found that antiglare films with an uneven surface gained by creating unevenness on the surface of a metal by blasting microscopic particles, forming a mold through electroless nickel plating on this uneven surface and transferring the uneven surface of this mold to a transparent resin film have sufficiently little haze, and that a reflection profile can be provided where the reflectance at a reflection angle of 30° is not more than 2% of light that enters to the film at an incident angle of 30° and the reflectance at a reflection angle of 40° is not more than 0.003%, and thus, the reflection profile shows the spread for the small reflectance in the direction of direct reflection, and the reflectance becomes sufficiently low at a reflection angle of not smaller than 60°. Furthermore, the inventors have found that the antiglare performance of this antiglare film can be further increased in comparison with conventional products, and reduction in the visibility due to the occurrence of discoloring to white and glare can be sufficiently suppressed, and moreover, a further examination was additionally conducted in a variety of manners, and thus, the present has been completed.

That is to say, unevenness is created on a surface of an antiglare film according to the present invention, where the reflectance R (30) at a reflection angle of 30° for light that enters at an incident angle of 30° is not more than 2%, and the reflectance R (40) at a reflection angle of 40° is not more than 0.003%, and any of the following requirements (1) to (5) are satisfied as a factor for the configuration:

(1) Protrusions of from 50 to 150 are provided within a region of 200 μm×200 μm;

(2) When the height of each point on the uneven surface of the film is represented in a histogram, the peak in the histogram is within a range between +20% and −20% with the middle point (height: 50%) between the highest point (height: 100%) and lowest point (height: 0%) at the center;

(3) The arithmetic average height Pa in a curve of the uneven surface of the film in an arbitrary cross section is from 0.08 μm and to 0.15 μm;

(4) The maximum height in a cross section Pt in a curve of the uneven surface of the film in an arbitrary cross section is from 0.4 μm to 0.9 μm; and (5) The average area of a polygon formed when Voronoi division is carried out on the surface of the film with peaks of protrusions in the unevenness as the generating point is from 300 μm$^2$ to 1000 μm$^2$.

It is further effective for the antiglare film to satisfy two or more among these factors for the configuration, and moreover, it is effective for it to satisfy all of these factors for configuration.

In this antiglare film, the surface haze for perpendicular incident light can be made not more than 5%.

This antiglare film can be advantageously manufactured in accordance with a method where microscopic particles are blasted onto a surface of a polished metal so as to form unevenness, electroless nickel plating is carried out on the uneven surface so as to form a mold, the uneven surface of this mold is transferred to a transparent resin film, and then, the transparent resin film to which an uneven surface has been transferred is peeled off from the mold. At this time, an antiglare film which satisfies the above described factors for the configuration can be fabricated by blasting microscopic particles of which the average particle diameter is in a range from 15 μm to 35 μm onto the surface of a metal, particularly particles in spherical form. In this method, it is advantageous to use the surface of a mold on which electroless nickel plating has been carried out as it is, without polishing the surface after the electroless nickel plating. The transparent resin film to which the uneven surface of the mold is transferred is gained by forming a light curing resin layer on the surface of a transparent base film, and this light curing resin layer is cured while being pressed against the uneven surface of the mold, and thereby, the uneven surface of the mold can be transferred to the light curing resin layer.

The antiglare film of the present invention can be used in an image display in combination with an image displaying element, such as a liquid crystal displaying element. Thus, the image display according to the present invention is provided with an antiglare film described above and the image displaying element, wherein this antiglare film is placed on the visible side of the image displaying element.

DESCRIPTION OF THE PREFERRED EMBODIMENTS

In the following, the preferable embodiments of the present invention are described in detail. Unevenness is created on the surface of an antiglare film of the present invention, and the reflectance R (30) at a reflection angle of 30° for light that enters at an incident angle of 30° is not less than 2% and the reflectance R (40) at a reflection angle of 40° is not more than 0.003%, and in addition, at least one of the above described factors for the configuration is included.

Figure 1:
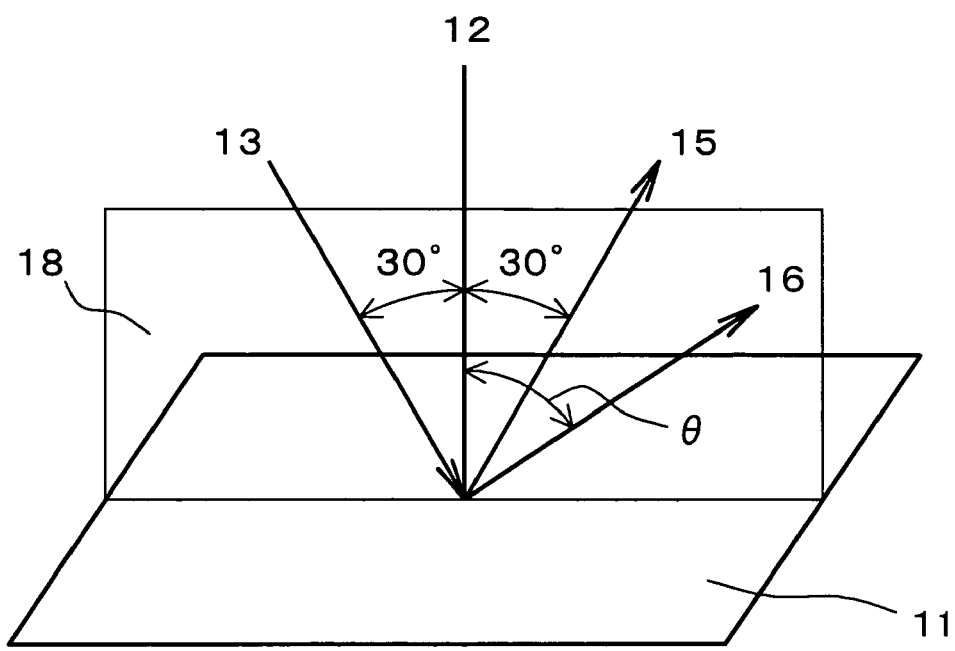
FIG. 1 is a perspective diagram schematically showing the direction in which light enters into an antiglare film, and the directions in which light is reflected.

First, an index with which the antiglare performance can be appropriately evaluated is described. FIG. 1 is a perspective diagram schematically showing the direction of incidence and reflection of light in an antiglare film. According to the present invention, R (30) is made to be not more than 2% when R (30) is the reflectance of reflected light in the direction of a reflection angle of 30° for incident light 13 that enters at an angle of 30° relative to normal 12 of an antiglare film 11, that is to say, in the direction of direct reflection 15 (that is to say, normal reflectance). It is preferable for this normal reflectance R (30) to be not more than 1.5%, particularly not more than 0.7%. In the case where the normal reflectance R (30) exceeds 2%, sufficient antiglare performance may not be obtained and visibility becomes low. Meanwhile, in the case where the normal reflectance R (30) is too small, there is a tendency for discoloring to white to occur, and therefore, it is preferable for the normal reflectance to be not less than 0.1%. In FIG. 1, light reflected at an arbitrary reflection angle θ is denoted by reference numeral 16, and the directions 15 and 16 of the reflected light, when the reflectance is measured, are within a plane 18 which includes the direction 13 of the incident light and normal 12.

Figure 2:
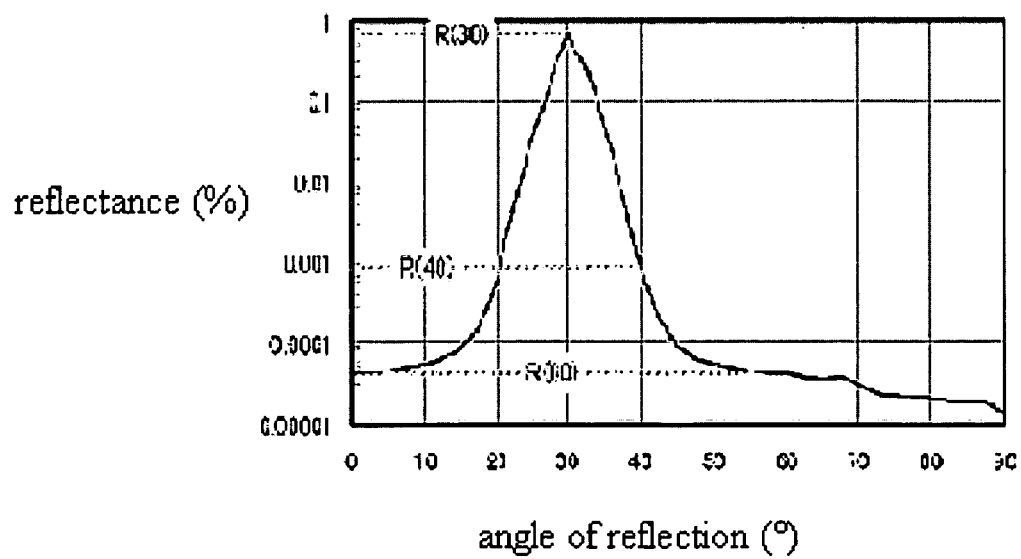
FIG. 2 is an example of a graph where the reflection angle and the reflectance (reflectance is on a logarithmic scale) of the reflected light that enters at an angle of 30° relative to the normal of the antiglare film are plotted.

FIG. 2 shows an example of a graph where the reflection angle and the reflectance (the reflectance is on a logarithmic scale) of reflected light 16 relative to incident light 13 that enters at an angle of 30° relative to normal 12 of antiglare film 11 in FIG. 1 are plotted. The graph showing this relationship between the reflection angle and the reflectance or the reflectance for each reflection angle that can be read from this may be referred to as a reflection profile. As shown in this graph, the normal reflectance R (30) is the peak of reflectance for incident light 13 that enters at 30°, and there is a tendency for the reflectance to lower as the angle widens from the direction of direct reflection.

In addition, according to the present invention, R (40) is made to be not more than 0.003% when R (40) is the reflectance of a reflection angle of 40° for incident light 13 that enters at an angle of 30° relative to normal 12 of an antiglare film 11 in FIG. 1. When R (40) exceeds 0.003%, discoloring to white easily occurs, and therefore, it is preferable for R (40) to be too high. Meanwhile, when R (40) is too small, sufficient antiglare performance is not exhibited, and therefore, in general, it is preferable for R (40) to be not less than 0.00005%. Here, it is difficult to precisely define the preferable range for R (40). This is because reflection and discoloring to white are subjectively evaluated through visual inspection, and are properties which in the end must reflect the preference of consumers.

Furthermore, it is preferable for the value of R (not less than 60)/R (30) to be not more than 0.001 when R (not less than 60) is the reflectance in an arbitrary direction at a reflection angle of not less than 60° for incident light 13 that enters at an angle of 30° relative to normal 12 of antiglare film 11 in FIG. 1. It is more preferable for this R (not less than 60)/R (30) to be not more than 0.0005, and it is most preferable for it to be not more than 0.0001. Here, concretely, an arbitrary direction at a reflection angle of not less than 60° is a direction at a reflection angle between 60° and 90°, and in many cases, as with antiglare films fabricated in accordance with the below described method, the reflectance in the direction of direct reflection is the peak, and the reflectance gradually lowers as the reflection angle becomes greater, as the typical reflection profile shows in FIG. 2, and in this case, the value of R (not less than 60)/R (30) can be represented by R (60)/R (30) when R (60) is the reflectance at a reflection angle of 60°. When the value of R (not less than 60)/R (30) exceeds 0.001, discoloring to white occurs in the antiglare film and the visibility tends to lower. In the case where black is displayed on the display surface in a state where an antiglare film is installed on the frontmost surface of a display, there is a tendency for discoloring to white to occur on the display surface, making the entirety whitish because of light collected from the surroundings.

In the example of a reflection profile shown in FIG. 2, the normal reflectance R (30) is approximately 0.7%, R (40) is approximately 0.0009%, and R (60) is approximately 0.00004%.

According to research by the present inventors, most antiglare films widely available on the market at present are of a type where a filler is dispersed, and in many cases, the surface haze in such types exceeds 5% and sometimes reaches 10% to 20%. In such antiglare films, R (40) is not less than 0.003% when measured in the above described manner, and though sufficient antiglare performance is exhibited, discoloring to white easily occurs. Meanwhile, the surface haze is sometimes less than 5%, and though discoloring to white does not occur in such antiglare films, the antiglare performance is insufficient or glare occurs. In contrast to this, antiglare films where the haze is low and R (30) is not more than 2% and R (40) is not more than 0.003% as defined in the present invention are unique, and it can be understood that such antiglare films have both sufficient antiglare performance and a function of keeping low discoloring to white and glare.

It is necessary to measure reflectance which is not more than 0.001% with high precision when measuring the reflectance of an antiglare film. Therefore, use of a detector having a wide dynamic range is effective. A commercially available photo power meter, for example, can be used as such a detector, and a multi-angle photometer where an aperture is provided in front of the detector of this photo power meter and the angle at which the antiglare film is viewed is 2° can be used for measurement. As the incident light, a visible light beam having a wavelength of from 380 nm to 780 nm can be used, and as the light source for measurement, light gained by collimating light emitted from a light source such as a halogen lamp may be used, or highly parallel light from a monochrome light source, such as a laser, may be used. In addition, in the case of a transparent antiglare film of which the rear surface is smooth, reflection from the rear surface of the antiglare film may affect the measured value, and therefore, it is preferable to optically connect a black acryl resin plate to the smooth surface of an antiglare film using an adhesive or a liquid such as water or glycerine, so that it is possible to measure only the reflectance on the frontmost surface of the antiglare film.

In addition to the above described reflection profile, the antiglare film of the present invention includes at least one of the following factors (1) to (5) as a factor for the configuration:

(1) Protrusions of from 50 to 150 are provided within a region of 200 μm×200 μm;

(2) When the height at respective points on the uneven surface of the film is represented in a histogram, the peak in the histogram is within a range between +20% and −20% with the middle point (height: 50%) of the highest point (height: 100%) and the lowest point (height: 0%) at the center;

(3) The arithmetic average height Pa in a curve of the uneven surface of the film in an arbitrary cross section is from 0.08 μm to 0.15 μm;

(4) The maximum height in a cross section Pt in a curve of the uneven surface of the film in an arbitrary cross section is from 0.4 μm and to 0.9 μm; and (5) The average area of a polygon formed when Voronoi division is carried out on the surface of the film with peaks of protrusions in the unevenness as the generating point is from 300 μm² and to 1000 μm².

First, the requirement (1): protrusions of from 50 to 150 are provided within a region of 200 μm×200 μm, is described. In the case where the number of protrusions on the uneven surface is small and such antiglare film is used in combination with an image display having high definition, glare occurs due to interference with pixels, making the image difficult to see, which is not preferable. In addition, in the case where the number of protrusions is too great, the resulting angle of inclination in the uneven form on the surface becomes steep, making the occurrence of discoloring to white easy. The number of protrusions within a region of 200 μm×200 μm is preferably not more than 120 and preferably not less than 80.

Figure 3:
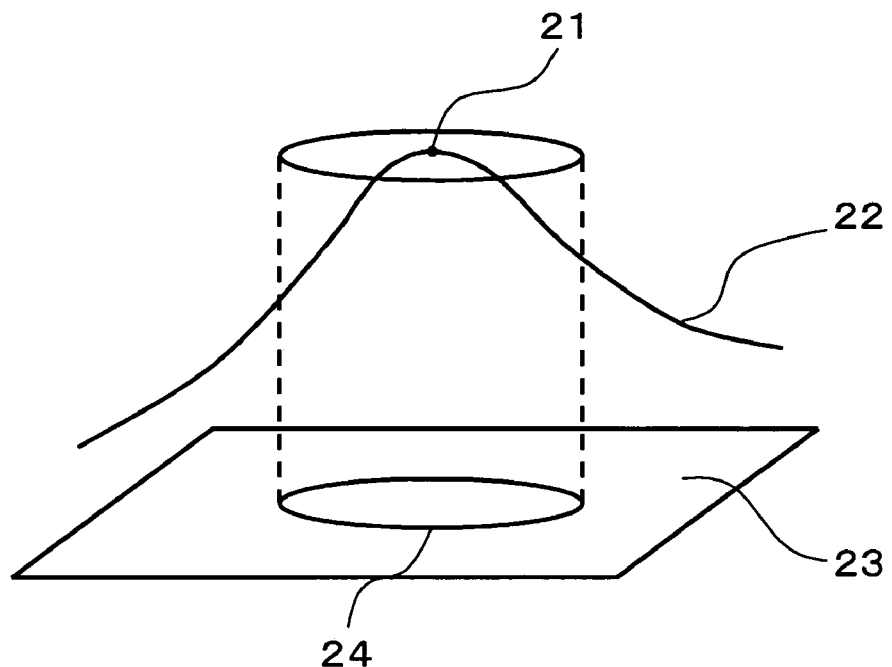
FIG. 3 is a perspective diagram schematically showing an algorithm for determining protrusions on an antiglare film.

In order to find the number of protrusions on the uneven surface of an antiglare film, the form on the surface is observed using an apparatus such as a confocal microscope, an interference microscope or an atomic force microscope (AFM) so that the three-dimensional coordinates at each point on the surface of the antiglare film can be found, and then, protrusions are identified following the below shown algorithm, and the number thereof is counted. That is to say, when an arbitrary point on the surface of the antiglare film is focused on, this point is defined as a vertex in the case where no points at which the height is greater than that of the point in focus exist in the surroundings of this point, and in the case where the height of this point on the uneven surface is more than the middle height between the highest point and the lowest point on the uneven surface, and the number of vertexes that have been found in this manner is counted as the number of protrusions. Concretely, as shown in FIG. 3, when an arbitrary point 21 on the surface of the antiglare film is focused on, and a circle of which the radius is 2 μm to 5 μm is drawn parallel to the reference surface 23 of the antiglare film with this point 21 at the center. At this time, in the case where no points at which the height is greater than that of the point in focus 21 exist among the points on the surface 22 of the antiglare film which is included within the surface 24 of the projection of this circle, the point 21 is defined as a vertex and the number of vertexes is found and the height at this point on the uneven surface is greater than the middle height between the highest point and the lowest point on the uneven surface. At this time, it is required for the radius of the above described circle 24 to have such a size that fine unevenness cannot be counted on the surface of the sample, and a number of protrusions are not included, and thus, approximately 3 μm is preferable. At the time of measurement, in order to lower the rate of error, it is preferable for three or more points to be measured in a region of 200 μm×200 μm, so that the average value can be used as the measured value.

In the case where a confocal microscope is used, the magnification of the object lens is approximately 50, and it is preferable to measure with reduced resolution. This is because when measured with high resolution, fine unevenness on the surface of the sample is measured and counting of protrusions is hindered. Here, when the magnification of the object lens is low, the resolution becomes low in the direction of the height, and therefore, it sometimes becomes difficult to measure the form on the surface of a sample having small unevenness. In this case, an object lens having high magnification is used for measurement, and after that, high components in the space frequency are dropped by passing the gained data through a low pass filter, so that fine roughness cannot be seen on the surface of the unevenness when observed, and then, the number of protrusions can be counted.

Next, the requirement (2): when the height at respective points on the uneven surface of the film is represented in a histogram, the peak in the histogram is within a range between +20% and −20% with the middle point (height: 50%) of the highest point (height: 100%) and the lowest point (height: 0%) at the center, is described. This requirement means that the peak in the histogram is within a range from 30% to 70% of the difference (maximum height) between the highest point and the lowest point. In the case where the peak does not exist within a range between +20% and −20% of the center point, in other words, in the case where the peak appears in a location that is more than 70% of the maximum height or in a location that is smaller than 30%, the resulting form on the surface is coarse, making the occurrence of glare easy, which is not preferable. In addition, the feel, that is the quality of appearance, tends to be lowered.

In order to find the histogram of the height, the form on the surface is observed using an apparatus such as a confocal microscope, an interference microscope or an atomic force microscope (AFM), so that the three-dimensional coordinates at each point on the surface of the antiglare film can be found and then identified in accordance with the algorithm shown in the following. That is to say, the highest point and the lowest point of the height on the surface of the antiglare film are found, and after that, the difference between the height at the measured point and the height at the lowest point (height at this point) is divided by the difference between the highest point and the lowest point (maximum height), and thereby, the relative height at each point is found. The found relative height is represented in a histogram where the highest point is 100% and the lowest point is 0%, and thus, the location of the peak in the histogram is found. It is necessary for the histogram to be divided in such a manner that the location of the peak is not affected by error in the data, and thus, it is preferable to divide it into approximately ten to thirty pieces for display. Here, at the time of measurement, in order to reduce the rate of error, it is preferable for three or more points to be measured in a region of 200 µm×200 µm or more, so that the average value can be used as the measured value.

Figure 4:
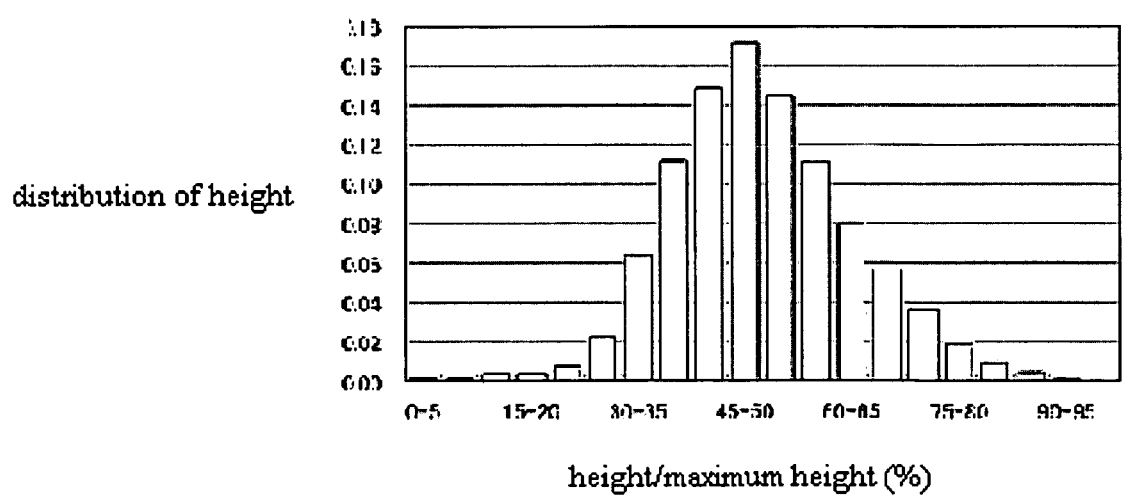
FIG. 4 is an example of a graph showing a histogram of height of an antiglare film.

FIG. 4 shows an example of a histogram of the height. In this figure, the lateral axis indicates the ratio (unit: %) of the height at the measured point to the above described difference between the highest point and the lowest point (maximum height), and is divided into intervals of 5%. The left longitudinal bar shows the distribution in a set where the ratio of the height is in a range from 0% to 5%, and in the following, the ratio of the height increases by 5% per bar going to the right. In the figure, the scale is shown for every three segments along the lateral axis. The longitudinal axis shows the distribution in the height, of which the value becomes 1 when integrated. In this example, the peak appears in a location between 45% and 50% of the maximum height. Here, FIGS. 11, 13, 15, 17, 19 and 21 showing the histograms of the below described examples and comparative examples are shown in the same manner as FIG. 4.

Next, the requirements (3): the arithmetic average height Pa in a curve of the uneven surface of the film in an arbitrary cross section is from 0.08 µm to 0.15 µm, and (4): the maximum height in a cross section Pt in a curve of the uneven surface of the film in an arbitrary cross section is from 0.4 µm to 0.9 µm, are described. The arithmetic average height Pa and the maximum height in a cross section Pt are defined in JIS B 0601 (ISO 4287), and the arithmetic average height Pa is the same as the value referred to as the average coarseness along the center line. In the case where the arithmetic average height Pa in the curve of the uneven surface in a cross section is less than 0.08 µm, the surface of the antiglare film becomes approximately flat, and sufficient antiglare performance is not exhibited, which is not preferable. In addition, in the case where the arithmetic average height Pa in the curve of a cross section is greater than 0.15 µm, the form on the surface becomes coarse, and discoloring to white and glare arise, which is also not preferable. Meanwhile, in the case where the maximum height in a cross section Pt in the curve of the uneven surface in a cross section is less than 0.4 µm, the surface of the antiglare film also becomes almost flat, and sufficient antiglare performance is not exhibited, which is not preferable. In addition, in the case where the maximum height in a cross section Pt in the curve of a cross section is greater than 0.9 µm, the form on the surface also becomes coarse, and discoloring to white and glare arise, which is not preferable.

The arithmetic average height Pa and the maximum height in a cross section Pt in a curve of the uneven surface in a cross section can be measured using a commercially available general contact type surface coarseness meter in accordance with JIS B 0601. In addition, it is also possible to find these by measuring the form on the surface using an apparatus such as a confocal microscope, an interference microscope or an atomic force microscope (AFM), and performing calculation on the basis of the three-dimensional information on the form on the surface. Here, in the case where the arithmetic average height Pa and the maximum height in a cross section Pt are calculated from the three-dimensional information, it is preferable to measure three or more points in a region of 200 µm×200 µm or more, and the average value is used as the measured value in order to secure a sufficient reference length.

Figure 5:
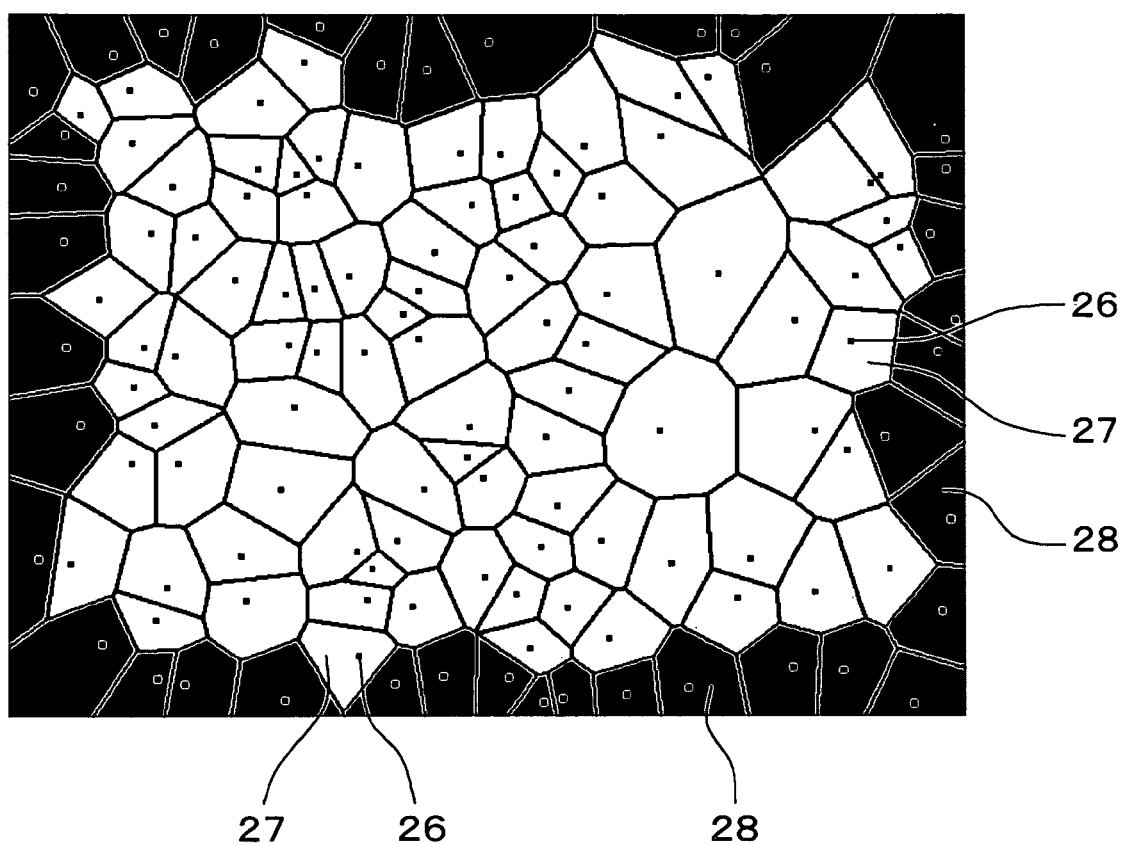
FIG. 5 is a Voronoi diagram showing an example of an antiglare film on which Voronoi division is carried out with the peaks of protrusions as generating points.

Next, the requirement (5): the average area of a polygon formed when Voronoi division is carried out on the surface of the film with peaks of protrusions in the unevenness as the generating point is from 300 µm$^2$ to 1000 µm$^2$, is described. First, Voronoi division is described. When several points (referred to as generating points) are placed in a plane, this plane is divided on the basis of what generating point an arbitrary point within this plane is closest to, and a thus, created diagram is referred to as a Voronoi diagram, and such division is referred to as Voronoi division. FIG. 5 shows an example where Voronoi division is carried out on the surface of an antiglare film with the peaks of the protrusions on the surface of the antiglare film as generating points, and square dots 26, 26 are generating points, and individual polygons 27, 27 which include one generating point are regions formed through Voronoi division, and are referred to as Voronoi regions or Voronoi polygons, and hereinafter, these are referred to as Voronoi polygons. Peripheral portions 28, 28, which are faintly shaded in this figure, are described in the following. The number of generating points and the number of Voronoi regions coincide in a Voronoi diagram.

In the case where the average area of Voronoi polygons which are formed by carrying out Voronoi division with the peaks of protrusions as generating points is smaller than 300 µm$^2$, the angle of inclination on the surface of the antiglare film becomes steep, and as a result, discoloring to white easily occurs, which is not preferable. In addition, in the case where the average area of the Voronoi polygons is more than 1000 µm$^2$, the form on the uneven surface becomes coarse and glare occurs, which is not preferable.

In order to find the average area of Voronoi polygons gained by carrying out Voronoi division with the peaks of protrusions on the surface of the antiglare film as generating points, the form on the surface is observed using an apparatus such as a confocal microscope, an interference microscope or an atomic force microscope (AFM), so that the three-dimensional coordinates of each point on the surface of the antiglare film can be found, and then, Voronoi division is carried out in accordance with the algorithm shown in the following, and the average area of the Voronoi polygons is found. The peaks of the protrusions on the surface of the antiglare film are found following the above described algorithm, and next, the peaks of these protrusions are projected onto the reference surface of the antiglare film. After that, all of the three dimensional coordinates gained through measurement of the form on the surface are projected onto this reference surface, and Voronoi division is carried out by assigning all of these projected points to the most proximate generating points, so that the area of the polygons gained through division is found, and thereby, the average area of the Voronoi polygons is found. In the measurement, the number of the above described protrusions is counted for Voronoi polygons that make contact with the border of the view for measurement, in order to reduce the rate of error, but they are not calculated when finding the average area. In addition, it is preferable for three or more points to be observed in an area of 200 µm×200 µm or more in order to reduce the rate of error, and for the average value of these to be used as the measured value.

As partially described in the above, FIG. 5 is a Voronoi diagram showing an example when Voronoi division is carried out with the peaks of the protrusions on the antiglare film as generating points. Many generating points 26, 26 are peaks of protrusions on the antiglare film, and one Voronoi polygon 27 is assigned per one generating point 26 through Voronoi division. In this figure, Voronoi polygons 28, 28 which make contact with the border of the view and are faintly shaded are not counted for the calculation of the average area, as described above. Here, though in this figure, curved lines and reference numerals are attached only to part of the generating points and Voronoi polygons, it can be easily understood from the above description and this figure that a great number of generating points and Voronoi polygons exist.

Here, it is preferable for the antiglare film of the present invention to have surface haze for perpendicular incident light of 5% or less. As described above, Patent Document 6 discloses that when the haze is high, the front contrast of the antiglare film becomes low when applied for a liquid crystal panel, and therefore, it is preferable for the haze to be 15% or less, and as a result of further examination, it was found out that the haze of an antiglare film can further be reduced when fabricated in accordance with a predetermined method. The surface haze of the antiglare film can be measured in accordance with the method shown in JIS K 7136. In the case where separation into surface haze and internal haze is necessary, haze throughout the entirety of the antiglare film is measured, and after that, a transparent film of which the haze is approximately 0 is pasted to the uneven surface thereof using glycerine, and then, the internal haze is measured, so that the surface haze can be found from the following formula.

surface haze=haze throughout entirety−internal haze

The haze value that is measured in a state where a transparent film of which the haze is approximately 0 is pasted to the uneven surface of an antiglare film may in fact be regarded as representing the internal haze, because the surface haze caused by the original unevenness is almost nullified. The transparent film of which the haze is approximately 0 is not particularly limited, as long as the haze is small, and a triacetyl cellulose film, for example, may be used.

In addition, it is preferable for the sum of the clarity of reflection measured at an incident angle of light of 45° using three types of optical combs where the width in dark portions and bright portions is 0.5 mm, 1.0 mm and 2.0 mm to be not more than 50% in the antiglare film of the present invention. The clarity of reflection is measured in accordance with the method prescribed in JIS K 7105. In this standard, four types of optical combs used for measurement of the clarity of the image, where the ratio of the width of dark portions to bright portions is 1:1 and the width is 0.125 mm, 0.5 mm, 1.0 mm and 2.0 mm are defined. In the case where, among these, the optical comb having a width of 0.125 mm is used, error in this measured value becomes great in the antiglare film defined in the present invention, and therefore, the measured value in the case where the optical comb having a width of 0.125 mm is not added to the sum and the sum of the clarity of the image measured using three types of optical combs having a width of 0.5 mm, 1.0 mm and 2.0 mm is referred to as the clarity of reflection. The maximum value of the clarity of reflection in the case this definition is followed is 300%. In the case where the clarity of reflection according to this definition exceeds 50%, the image of the light source or the like is clearly reflected, making the antiglare properties inferior, which is not preferable.

However, in the case where the clarity of reflection is not more than 50%, it becomes difficult to determine whether the antiglare properties are excellent or poor only from the clarity of reflection. This is because in the case where the clarity of reflection according to the above definition is not more than 50%, the clarity of reflection using each of the optical combs having a width of 0.5 mm, 1.0 mm and 2.0 mm becomes approximately 10% to 20% at best, and deviation in the clarity of reflection due to error in measurement cannot be ignored. Therefore, the present inventors compared the antiglare properties through visual inspection, to see whether they are excellent or poor for antiglare films of which the clarity of reflection is not more than 50% and which are obtained in accordance with the below described manufacturing method. The results of evaluation of the antiglare properties through visual inspection and the above described reflection profile were compared and examined, and thus, an index appropriate for evaluating the antiglare performance of the antiglare film of the present invention was gained.

It is preferable for the antiglare film of the present invention not to have glare until the density of pixels in image displaying elements having high definition which are used together becomes 90 ppi (pixel per inch). In the case where glare is perceived when the density of pixels is not more than this, the antiglare film cannot be used in combination with an image displaying element having high definition, which is not preferable.

Figure 6:
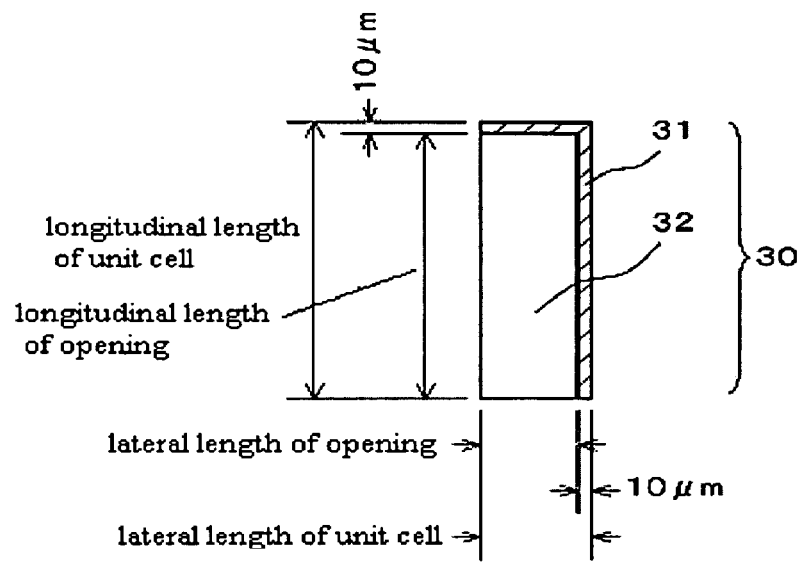
FIG. 6 is a plan diagram showing a unit cell of a pattern for evaluating glare.

Glare can be evaluated in accordance with the following method. First, a photomask having a pattern of unit cells as shown in the plan diagram of FIG. 6 is prepared. In this figure, a chromium light blocking pattern 31 in hook form having a line width of 10 μm is formed on a transparent substrate, and the portion where this chromium light blocking pattern 31 is not formed forms an opening 32 in a unit cell 30. In the below described example, the dimensions of the unit cell is 282 μm×94 μm (longitudinal×lateral in the figure), and accordingly, a photomask of which the dimensions in the opening portion are 272 ηm×84 μm (longitudinal×lateral in the figure) was used. A great number of unit cells, each of which the same as that shown in the figure, are aligned, forming a photomask.

Figure 7:
FIG. 7 is a schematic cross sectional diagram showing a state for evaluating glare.
Figure 7:
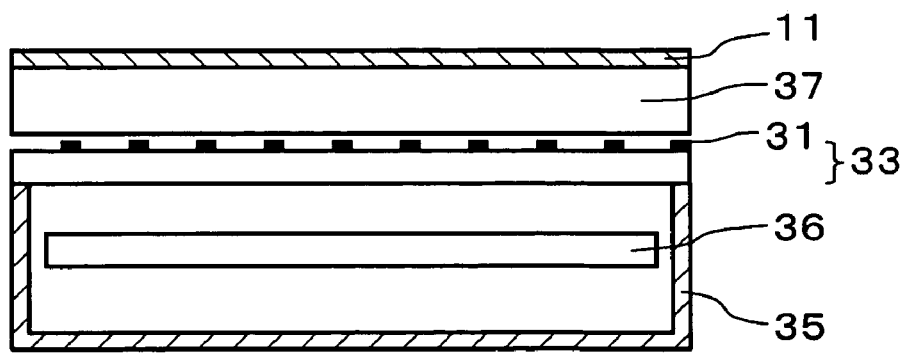

In addition, as shown in the schematic cross sectional diagram of FIG. 7, the photomask 33 is placed on a light box 35 with the chromium light blocking pattern 31 on the upper side, and a sample where an antiglare film is pasted to a glass plate 37 with an adhesive is placed on the photomask 33. A light source 36 is placed in the light box 35. In this state, functional evaluation of glare is carried out by observing the sample through visual inspection from a point 39 approximately 30 cm at a distance from the sample.

Next, a method in accordance with which an appropriate antiglare film according to the present invention can be manufactured, and a manufacturing method for a metal mold with which such an antiglare film can be gained and on the surface of which unevenness is created are described. An antiglare film according to the present invention can be advantageously manufactured in accordance with a method using a metal mold in predetermined form on which unevenness is formed for transferring the uneven surface of this mold to a transparent film, and then removing the transparent resin film to which the uneven surface has been transferred from the mold. In addition, in order to gain a metal mold having unevenness, unevenness is created on the surface of a metal by blasting microscopic particles, and after that, electroless nickel plating is carried out, and thus, a mold is provided.

Figure 8:
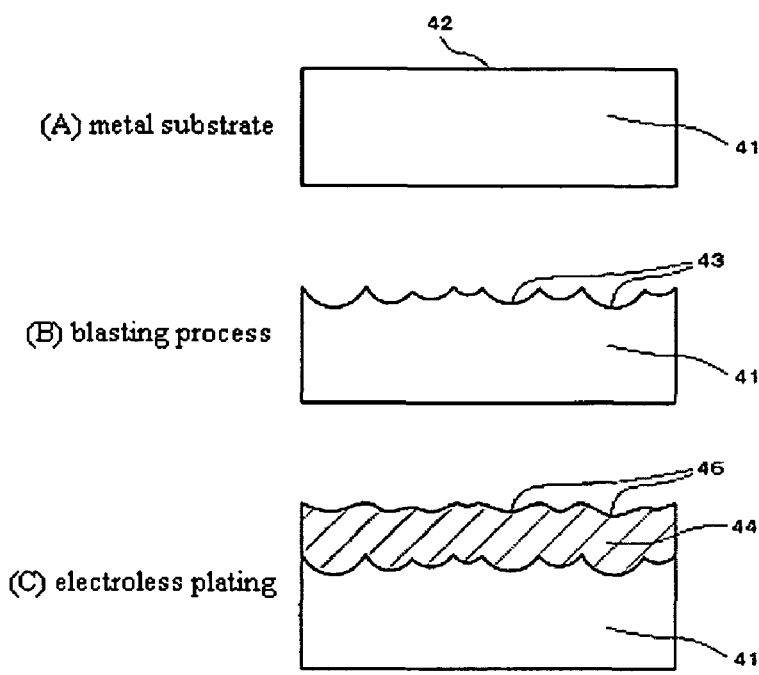
FIGS. 8A to 8C are schematic cross sectional diagrams showing the steps of a manufacturing method for a metal mold.

FIGS. 8A to 8C are cross sectional diagrams schematically showing the steps through which a metal mold is gained, and a case where a metal plate is used is illustrated. FIG. 8A shows a cross section of a metal substrate 41 after polishing to a mirror surface, and a polished surface 42 is formed on the surface. Unevenness is created on the surface by blasting microscopic particles onto the surface of this metal after polishing to a mirror surface. FIG. 8B is a schematic cross sectional diagram showing the metal substrate 41 after microscopic particles have been blasted and microscopic concave surfaces 43 in partial spherical form have been created through blasting of microscopic particles. Furthermore, sharp points in the uneven form on the metal surface are rounded by carrying out electroless nickel plating on the surface on which unevenness has been created using microscopic particles in this manner. FIG. 8C is a schematic cross sectional diagram showing the metal surface after electroless nickel plating has been carried out, where a nickel plating layer 44 is formed over microscopic concave surfaces formed on the metal substrate 41 and this surface 46 is in a state where sharp points have been rounded through electroless nickel plating, as compared to concave surfaces 43 in FIG. 8B; in other words, in a state where the uneven form is softened. As described above, electroless nickel plating is carried out on microscopic concave surfaces 43 in partial spherical form formed by blasting microscopic particles onto the surface of a metal, and thereby, a metal mold having essentially no flat portions, where unevenness which is appropriate for gaining an antiglare film exhibiting preferable optical properties is created, can be gained.

Aluminum, iron, copper, stainless steel and the like can be cited as the metal appropriate for use in the present invention. Among these, metals of which the surface is easily deformed through blasting of microscopic particles include metals of which the hardness is not very high are preferable, and it is preferable to use aluminum, iron, copper or the like. From the point of view of cost, aluminum and soft iron are more preferable. As for the form of the metal mold, a flat metal plate may be used, or a metal roll in cylindrical form may be used. In the case where a mold is fabricated using a metal roll, an antiglare film can be manufactured in continuous roll form.

Microscopic particles are blasted onto these metals in a state where the surface is polished, and in particular, it is preferable for the surface to have been polished to such a state as to be close to a mirror surface. This is because mechanical processing, for example cutting and polishing, has in many cases been carried out on a metal plate or a metal roll in order to gain a form with desired precision, and as a result, traces of processing remain on the metal surface. There are cases where traces of processing are deeper than the unevenness formed using microscopic particles, when the metal surface in a state where there are deep traces of processing changes in form as a result of blasting of microscopic particles, and thus, the traces of processing remain influential, so that the optical properties may be affected in an unexpected manner.

The method for polishing the metal surface is not particularly limited, and any of a mechanical polishing method, an electrolytic polishing method and a chemical polishing method can be used. The mechanical polishing method includes an ultra-finishing method, lapping, a fluid polishing method, a buff polishing method and the like. As for the surface coarseness after polishing, it is preferable for Ra to be not more than 1 µm, when Ra is the average coarseness along the center line, it is more preferable for Ra to be not more than 0.5 µm, and it is most preferable for Ra to be not more than 0.1 µm. In the case where Ra is too great, there is a possibility that the surface coarseness before changing in form may remain influential even after the metal surface changes in form as a result of blasting of microscopic particles, which is not preferable, and in addition, there is no particular lower limit for Ra, because it is naturally limited from taking into consideration the time for processing and cost for processing, and thus, it is not particularly necessary to impose any limitation.

As for the method for blasting microscopic particles onto the surface of a metal, a blast processing method is appropriate for use. As the blast processing method, there are a sandblasting method, a shot blasting method and a liquid honing method. As for the particles used in these processes, particles in a form which is close to spherical, rather than a form having sharp angles, are preferable, and particles made of a hard material are preferable, so that no sharp angles are created due to crushing of the particles during processing. As particles which satisfy these conditions, spherical beads made of zirconia and beads made of alumina are preferable for use, among ceramic based particles. In addition, beads made of steel or stainless steel are preferable, among metal based particles. Furthermore, particles where ceramic or metal particles are carried in a resin binder may be used.

Here, microscopic particles, specifically spherical microscopic particles having an average particle diameter of 15 µm to 35 µm, are used as microscopic particles for blasting the surface of the metal, and thereby, an antiglare film having a factor for the configuration which includes a requirement for providing 250 or more protrusions within a region of 200 µm×200 µm as prescribed in the present invention can be obtained. It is particularly preferable for these microscopic particles to have approximately the same particle diameter, that is to say, to be monodisperse. In the case where the average particle diameter of the microscopic particles is smaller than 15 µm, it becomes difficult to form sufficient unevenness on the metal surface, and in addition, the angle of inclination of the surface becomes steep, making the occurrence of discoloring to white easy. Meanwhile, in the case where the average particle diameter of microscopic particles is more than 35 µm, the unevenness on the surface becomes coarse, glare occurs and the feel, that is the quality of appearance, tends to be deteriorated.

In one aspect, the present invention is characterized in that electroless nickel plating is carried out on the metal surface where unevenness is created in the above described manner, and thereby, sharp points on the uneven surface are rounded, and thus, a metal plate is fabricated. Though no generalizations can be made in terms of how much sharp points on the uneven surface are rounded, because it should be different, depending on the type of base metal, the size and depth of the unevenness obtained in accordance with a technique such as blasting, and the type and thickness of plating, the most important factor in controlling how much sharp points are rounded is the thickness of plating. When the thickness of electroless nickel plating is small, the effects of rounding sharp points on the surface of the uneven form obtained in accordance with a technique such as blasting are insufficient, and the optical properties of the antiglare film gained by transferring this uneven form to a transparent film are not very good. Meanwhile, in the case where the thickness of plating is too great, productivity becomes poor. It is preferable for the thickness of the electroless nickel plating according to the present invention to be from 3 µm to 70 µm, and it is more preferable for it to be not less than 5 µm and not more than 50 µm.

According to the present invention, electroless plating on the surface of a metal plate or a metal roll, which makes it possible to provide plating having a uniform thickness from a macro point of view, in particular, electroless nickel plating where the hardness of the plating layer is high, is adopted. As preferable electroless nickel plating, so-called gloss nickel plating using a plating bath which includes a glossing agent, such as sulfur, nickel-phosphorous alloy plating (low phosphorous type, middle phosphorous type or high phosphorous type), nickel-boron plating and the like can further be cited as examples.

Hard chromium plating, particularly electrolytic chromium plating, which is adopted in Patent Document 1, Patent Document 4 and Patent Document 5 cited in the section BACKGROUND OF THE INVENTION, makes an electrical field concentrate in an end portion of a metal plate or a metal roll, and thus, makes the thickness of plating different between the center portion and the end portion. Therefore, even in the case where unevenness is created so as to have a uniform depth throughout the entire surface of a plate in accordance with a technique such as blasting, as described above, how much sharp points on the uneven surface are rounded after plating differs depending on the location on the plate, and thus, the depth of the resulting unevenness differs depending on the location, and thus, it is not preferable to use electrolytic plating.

In addition, hard chromium plating as described above is not appropriate for fabricating a metal mold for an antiglare film, because it may create roughness on the plated surface. This is because the plated surface is generally polished after hard chromium plating in order to erase the roughness, and polishing on the surface after plating is not preferable, as described below, in the present invention.

However, in the present invention, in order to increase the hardness on the surface after electroless nickel plating has been carried out on the uneven metal surface, extremely thin chromium plating formed on the outermost surface, so-called flush chromium plating, is not excluded. In the case where flush chromium plating is carried out, it is necessary to make the flush chromium plating thin to such a degree that the form of the electroless nickel plating on the base is not lost, and the thickness is preferably not more than 3 μm and more preferably not more than 1 μm.

Figure 9:
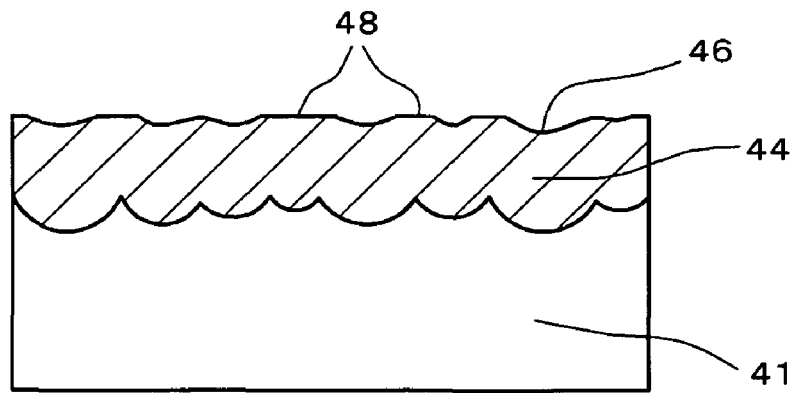
FIG. 9 is a schematic cross sectional diagram showing a state of the polished surface after electroless nickel plating.

In addition, it is preferable not to polish the metal plate or roll after plating, in the present invention, unlike with the metal plate or roll disclosed in the above described Patent Document 5. This is because flat portions are created on the outermost surface through polishing, and therefore, there is a possibility that the optical properties may deteriorate, and the number of factors for controlling the form increases, making it difficult to control the form in a highly reproducible manner. FIG. 9 is a schematic cross sectional diagram showing a metal plate having a flat surface in the case where sharp points are rounded through electroless nickel plating on the uneven surface gained by blasting microscopic particles is polished, and, concretely, shows a state where the surface of the nickel plating layer 44 in the state of FIG. 8C is polished. Some protrusions are shaved through polishing within the surface unevenness 46 on the nickel plating layer 44 that has been created on the surface of the metal 41, and thus, flat surfaces 48 are created.

Next, a process for manufacturing an antiglare film using a thus gained metal mold is described. The form of the metal mold gained in accordance with the above described method is transferred to a transparent resin film, and thereby, an antiglare film is gained. It is preferable to transfer the form of the mold to a film through embossing. As the embossing, a UV embossing method using a light curing resin and a hot embossing method using a thermoplastic resin can be cited as examples.

In accordance with a UV embossing method, a light curing resin layer is formed on the surface of a transparent base film, and this light curing resin layer is hardened while being pressed against the uneven surface of a mold, and thereby, the uneven surface of the mold is transferred to the light curing resin layer. For example, an ultraviolet ray curing resin is applied to a transparent base film, and the transparent base film side is irradiated with ultraviolet rays in a state where the applied ultraviolet ray curing resin makes contact with the metal mold, and thus, the ultraviolet ray curing resin is hardened, and after that, the transparent base film on which the hardened ultraviolet ray curing resin layer has been formed is peeled from the metal mold, and thereby, the form of the metal mold is transferred to the ultraviolet ray curing resin. The type of ultraviolet ray curing resin is not particularly limited. In addition, though the expression ultraviolet ray curing resin is used, a resin which can be cured with visible light of which the wavelength is longer than that of ultraviolet rays can be provided by selecting an appropriate photo curing initiator. Ultraviolet ray curing resin in the present invention is a general term including visible light curing resin, as described above. Meanwhile, in accordance with a hot embossing method, a transparent thermoplastic resin film is pressed against a metal mold in a heated state, and thus, the form on the surface of the mold is transferred to a thermoplastic resin film. From among these embossing methods, a UV embossing method is preferable, from the point of view of productivity.

Any film which is essentially optically transparent can be used as the transparent base film in the fabrication of an antiglare film, and includes resin films, such as triacetyl cellulose films and polyethylene terephthalate films.

A commercially available ultraviolet ray curing resin can be used as the ultraviolet ray curing resin. For example, multifunctional acrylate, such as trimethylolpropane triacrylate and pentaerythritol tetraacrylate, can be used alone, or a mixture of two or more types of these, and these may be mixed with a photo polymerization initiator, such as "Irgacure 907," "Irgacure 184" (made by Ciba Specialty Chemicals K.K.) or "Lucirin TPO" (made by BASF Japan Ltd.) for use as the ultraviolet ray curing resin.

Any film which is essentially transparent can be used as the thermoplastic transparent resin film in the hot embossing method, and, for example, a solvent cast film or an extruded film of a thermoplastic resin, such as amorphous annular polyolefin having polymethyl methacrylate, polycarbonate, polyethylene terephthalate, triacetyl cellulose or a norbornene based compound as a monomer, can be used. These transparent resin films can also be used as the transparent base film in the case where the above described UV embossing method is used.

The antiglare film of the present invention has sufficient antiglare performance even in a state where there is no low reflection film on the outermost surface on the uneven surface, and can be used in a state where a low reflection film is attached to the outermost surface. The low reflection film can be formed by providing a layer of a material with low reflectance, which is lower than the reflectance of an antiglare layer, on top of the antiglare layer. As for the low reflectance material, inorganic low reflection materials where a microscopic powder of an inorganic material such as lithium fluorine (LiF), magnesium fluorine ($MgF_2$), aluminum fluorine ($AlF_3$) or cryolite ($3NaF.AlF_3$ or $Na_3AlF_6$), is contained in an acryl based resin or an epoxy based resin, as well as organic low reflection materials such as fluorine based or silicone based organic compounds, thermoplastic resins, thermosetting resins and ultraviolet ray curing resins can be cited as examples.

The antiglare film of the present invention which is formed as described above has excellent antiglare effects, and discoloring to white can be effectively suppressed, and therefore, the antiglare film has excellent visibility when placed on an image display. In the case where the image display is a liquid crystal display, this antiglare film can be layered on a polarizing film. That is to say, many polarizing films generally have a form where a protective film is layered on at least one side of a polarizer made of a polyvinyl alcohol based resin film where iodine or dichromatic dye is absorbed and oriented, and an antiglare polarizing film is obtained by pasting an antiglare film where unevenness is created as described above to one surface of such a polarizing film. In addition, a film where antiglare unevenness is created as described above may be used as both a protective film and an antiglare layer, and may be pasted to one surface of the polarizer so that the uneven surface thereof faces outside, and thereby, an antiglare polarizing film can be obtained. Furthermore, antiglare unevenness is provided as described above on the surface of the one side protective film in a polarizing film where a protective film has been layered, and thereby, an antiglare polarizing film can be obtained.

In an image display according to the present invention, an antiglare film having a specific reflection profile and a surface form as described above is combined with an image displaying element. Here, the image displaying element is represented by a liquid crystal panel which is provided with a liquid crystal cell where liquid crystal is sealed between the upper and lower substrates, and the orientation state of the liquid crystal is changed through the application of voltage, and thereby, an image is displayed, and in addition, the antiglare film of the present invention can be applied to any of a variety of well known displays such as a plasma display panel, a Braun tube (cathode ray tube: CRT) display and an organic electroluminescence (EL) display. Thus, the above described antiglare film is placed on the visible side of the image displaying element, and thereby, an image display is formed. At this time, the antiglare film is placed so that the uneven surface of the antiglare film faces outside (on the visible side). The antiglare film may be directly pasted to the surface of an image displaying element, or in the case where a liquid crystal panel is used as an image displaying element, the antiglare film may be pasted to the surface of the liquid crystal panel through a polarizing film as described in the above example. As described above, in an image display which is provided with an antiglare film of the present invention, incident light is scattered by the unevenness on the surface of the antiglare film so that the reflected image can be faded and excellent visibility can be provided.

EXAMPLES

In the following, examples are illustrated and the present invention is described in further detail, but the present invention is not limited to these examples. A method for evaluating an antiglare film is as follows in the following examples.

(Measurement of Surface Haze)

A haze meter, type "HM-150" made by Murakami Color Research Laboratory Co., Ltd., in accordance with JIS K 7136, was used, and the haze throughout the entirety and the internal haze of the antiglare films were measured. Samples were pasted to a glass substrate in such a manner that the uneven surface became the surface using an optically transparent adhesive in order to prevent distortion before being measured. The value gained by directly measuring the haze of a sample was referred to as the haze throughout the entirety, and the value that was measured when a transparent film (here, a triacetyl cellulose film was used), of which the haze was approximately 0 was optically pasted to the uneven surface of a sample using glycerine, was referred to as an internal haze, and the surface haze was found in the following equation.

surface haze=haze throughout entirety−internal haze (Measurement of Transmitting Clarity)

Measurement was carried out using a mapping measuring instrument "ICM-1DP", made by Suga Test Instruments Co., Ltd., in accordance with JIS K 7105. A sample was measured after being pasted to a glass substrate so that the uneven surface became a surface using an optically transparent adhesive in order to prevent distortion of the sample. Measurement was carried out by making light enter into the sample (antiglare film) side in this state. Here, the measured value was a total value of values which were measured using four types of optical combs where the widths of dark and bright portions were 0.125 mm, 0.5 mm, 1.0 mm and 2.0 mm, respectively.

(Measurement of Reflecting Clarity)

Measurement was carried out using the same mapping measuring instrument "ICM-1DP" as above. A sample was measured after being pasted to a glass substrate so that the uneven surface became a surface using an optically transparent adhesive in order to prevent distortion of the sample. In addition, a black acryl resin plate having a thickness of 2 mm was pasted with water to the glass surface of the glass plate, to which an antiglare film had been pasted, in order to prevent reflection from the rear glass surface, and measurement was carried out by making light enter into the sample (antiglare film) side in this state. Here, the measured value was a total value of values which were measured in the same manner as described above using three types of optical combs where the widths of dark and bright portions were 0.5 mm, 1.0 mm and 2.0 mm.

(Measurement of Reflectance)

The uneven surface of an antiglare film was irradiated with parallel light from a He—Ne laser in the direction that was inclined by 30° from the normal of the film, and the reflectance within a plane, including the normal of the film and the direction of irradiation, was measured at various angles. For the measurement of reflectance in all cases, an "optical power sensor 3292 03" and an "optical power meter 3292," made by Yokogawa Electric Corporation were used.

(Counting of Number of Protrusions)

The form on the surface of an antiglare film was observed using a confocal microscope "PLμ2300", made by Sensofar Japan Ltd. A sample was observed after being pasted to a glass substrate so that the uneven surface became a surface using an optically transparent adhesive in order to prevent distortion of the sample. The magnification of the object lens was 50, and counting was carried out with a low resolution. This was done so because in the case where a sample was observed with a high resolution, even microscopic protrusions on the surface of the sample were counted, thus hindering the counting of the protrusions.

(Measurement of Height Histogram)

The form on the surface of an antiglare film was observed using the same confocal microscope "PLμ2300" as above. A sample was observed after being pasted to a glass substrate so that the uneven surface became a surface using an optically transparent adhesive in order to prevent distortion of the sample. The magnification of the object lens was 50.

(Measurement of Arithmetic Average Height Pa and Maximum Height in Cross Section Pt in Curve in Cross Section)

The form on the surface of an antiglare film was observed using the same confocal microscope "PLμ2300" as above. A sample was observed after being pasted to a glass substrate so that the uneven surface became a surface using an optically transparent adhesive in order to prevent distortion of the sample. The magnification of the object lens was 50. The arithmetic average height Pa and the maximum height in a cross section Pt were found through a calculation in accordance with a method in accordance with JIS B 0601 on the basis of the observed data.

(Measurement of Average Area of Voronoi Polygons When Voronoi Division was Carried Out)

The form on the surface of an antiglare film was observed using the same confocal microscope "PLμ2300" as above. A sample was observed after being pasted to a glass substrate so that the uneven surface became a surface using an optically transparent adhesive in order to prevent distortion of the sample. The magnification of the object lens was 50. The average area of the Voronoi polygons was found through a calculation in accordance with the above described algorithm on the basis of the observed data.

(Evaluation of Glare)

The glare was evaluated in accordance with a method as described in the above in reference to FIGS. 6 and 7. That is to say, a photomask having a pattern of unit cells shown in FIG. 5 was fabricated, and this was placed on a light box 35 so that a chromium light blocking pattern 31 of the photomask 33 faced upwards as shown in FIG. 7, and a sample where an antiglare film 11 was pasted to a glass plate 37 having a thickness of 1.1 mm, using an adhesive having a thickness of 20 μm, was placed on the photomask 33, and the sample was observed through a visual inspection from a place 39 which was approximately 30 cm at a distance from the sample, and thereby, the degree of the glare was functionally evaluated using 7 levels. Level 1 corresponds to a state where no glare is observed at all, Level 7 corresponds to a state where the glare is extreme, and Level 3 corresponds to a state where the glare is observed only slightly.

(Evaluation Through Visible Inspection of Reflection and Discoloring to White)

An antiglare film was observed through visible inspection within a bright room where fluorescent lights were on, and the existence of the reflection of a fluorescent light and the degree of discoloring to white were checked.

Example 1

The surface of an aluminum roll (A5056 according to JIS) having a diameter of 300 mm was polished to a mirror surface. Zirconia beads "TZ-SX-17", made by Tosoh Corporation (trademark, having an average grain diameter of 20 mm), were blasted onto the outer surface of the gained aluminum roll polished to a mirror surface under a pressure for blasting at 0.1 MPa (gauge pressure, same as in the following), using a blasting apparatus (gained from Fuji Manufacturing Co., Ltd.) so that unevenness was created on the surface. An electroless gloss nickel plating process was carried out on the gained uneven aluminum roll, and thus, a metal mold was fabricated. The thickness of the plating was set at 15 μm, and the thickness of the plating was measured after plating using a β ray film thickness measuring instrument (trademark: "Fisher Scope MMS", gained from Fischer Instruments K.K.) so as to find that the thickness was 17.2 μm.

Separately, a photo-curing resin composite "GRANDIC 806T" (trademark), made by Dainippon Ink and Chemicals Incorporated, was dissolved in ethyl acetate so as to gain a solution having a concentration of 50 wt %, and furthermore, 5 weight parts of "Lucirin TPO" (made by BASF Japan Ltd., chemical name: 2,4,6-trimethyl benzoyl diphenylphosphine oxide), which is a photo polymerization initiator, was added to the solution containing 100 weight parts of a curing resin component, and thus, an application liquid was prepared. This application liquid was applied to a triacetyl cellulose (TAC) film having a thickness of 80 μm so that the thickness of the application after being dried became 5 μm and then was dried for 3 minutes in a dryer of which the temperature was set at 60° C. The film after being dried was made to make contact with and was pressed against the uneven surface of the metal mold, which was fabricated in the above, with a rubber roll so that the photo-curing resin composite layer was placed on the nickel plating layer side. In this state, the TAC film side was irradiated with light from a high pressure mercury lamp with an intensity of 20 mW/cm$^2$ where the amount of light was 200 mJ/cm$^2$ when light was converted to h lines through calculations, and thus, the photo-curing resin composite layer was cured. After this, the TAC film was removed from the mold together with the cured resin, and thus, a transparent antiglare film, which was a multilayer body made of a cured resin having unevenness on the surface and a TAC film, was fabricated.

Figure 10:
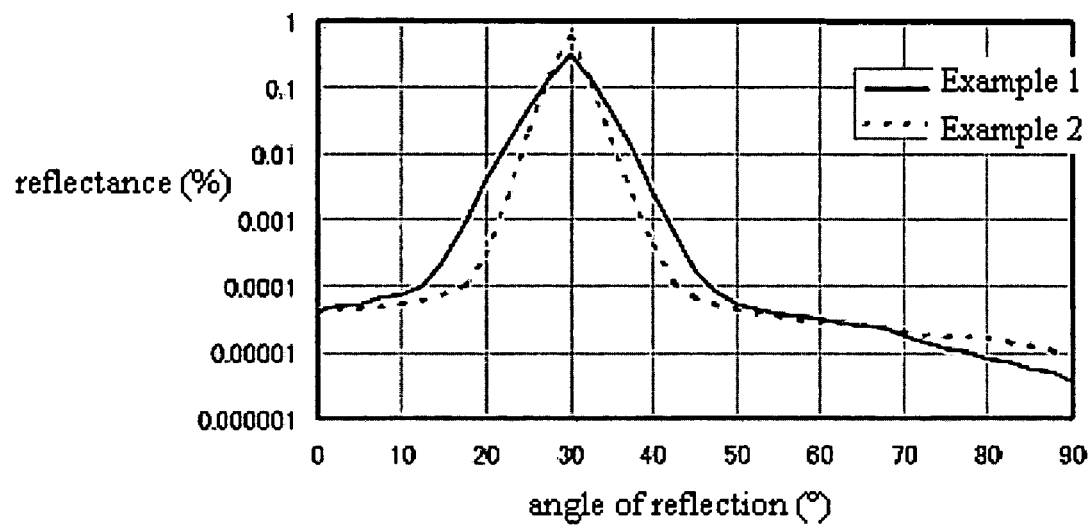
FIG. 10 is a graph showing the reflection profile of antiglare films obtained in Examples 1 and 2.

The optical properties of the gained antiglare film were evaluated in accordance with the above described techniques, and the results are shown in Table 1. Here, as for the transmitting clarity, the value was approximately 25% when an optical comb having a width of 0.125 mm was used, the value was approximately 21% when an optical comb having a width of 0.5 mm was used, the value was approximately 23% when an optical comb having a width of 1.0 mm was used, and the value was approximately 41% when an optical comb having a width of 2.0 mm was used, and the total of these values was 110.0% as described in Table 1. In addition, as for the reflecting clarity, the value was approximately 4% when an optical comb having a width of 0.125 mm was used, the value was approximately 3% when an optical comb having a width of 0.5 mm was used, the value was approximately 6% when an optical comb having a width of 1.0 mm was used, and the value was approximately 12% when an optical comb having a width of 2.0 mm was used, and the total of the values when optical combs having widths of 0.5 mm, 1.0 mm and 2.0 mm were used among the above described values was 21.1% as described in Table 1. In addition, the results of the evaluation of the form on the uneven surface of the gained antiglare film and the antiglare performance are shown in Table 2, scattering properties of the reflected light gained when the reflectance was measured (graph of reflection profile) are shown in FIG. 10, and the histogram of height was shown in FIG. 11, respectively.

Examples 2 to 6

Figure 11:
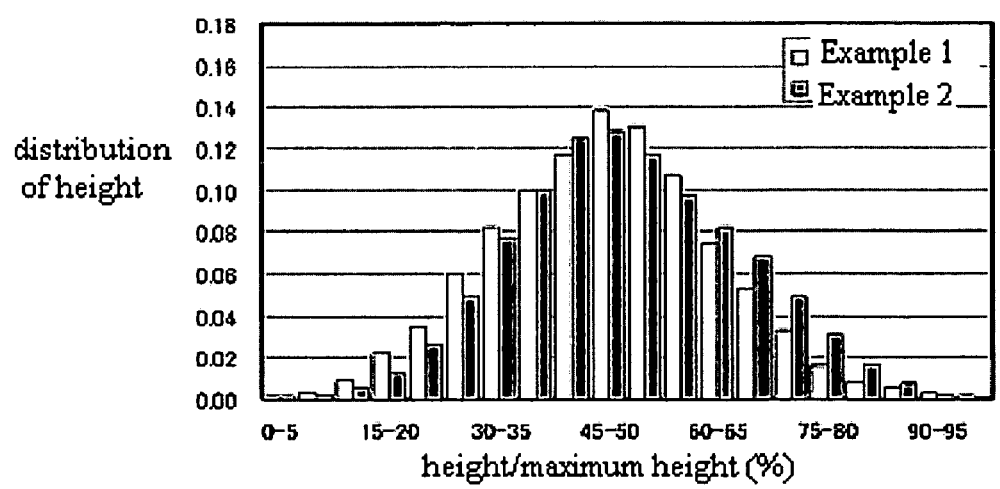
FIG. 11 is a histogram of height of antiglare films obtained in Examples 1 and 2.
Figure 12:
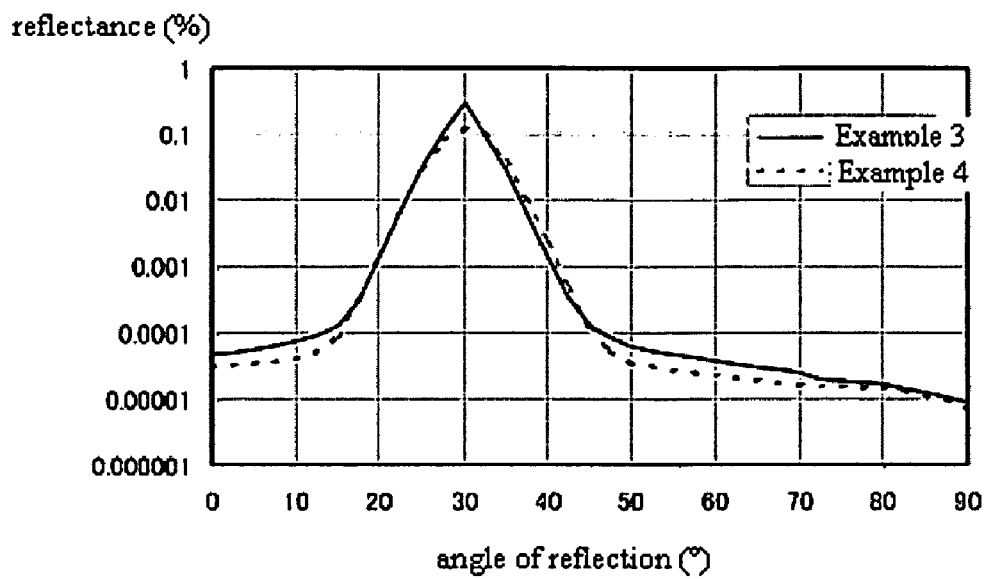
FIG. 12 is a graph showing the reflection profile of antiglare films obtained in Examples 3 and 4.
Figure 13:
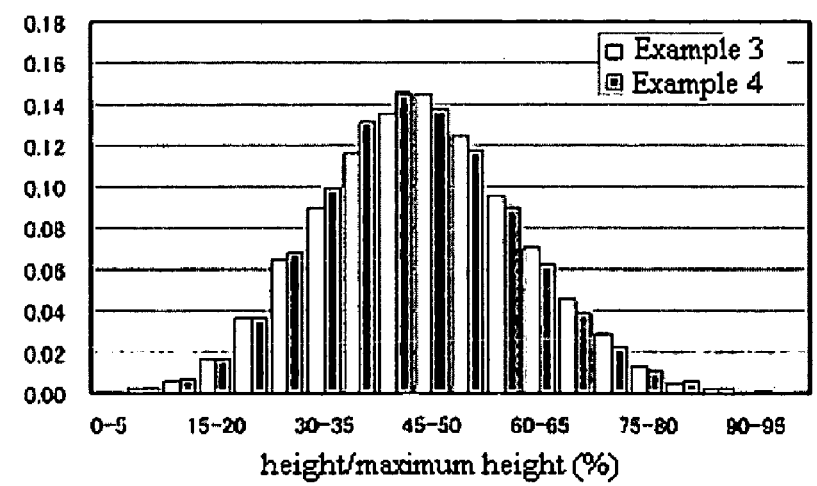
FIG. 13 is a histogram of height of antiglare films obtained in Examples 3 and 4.
Figure 14:
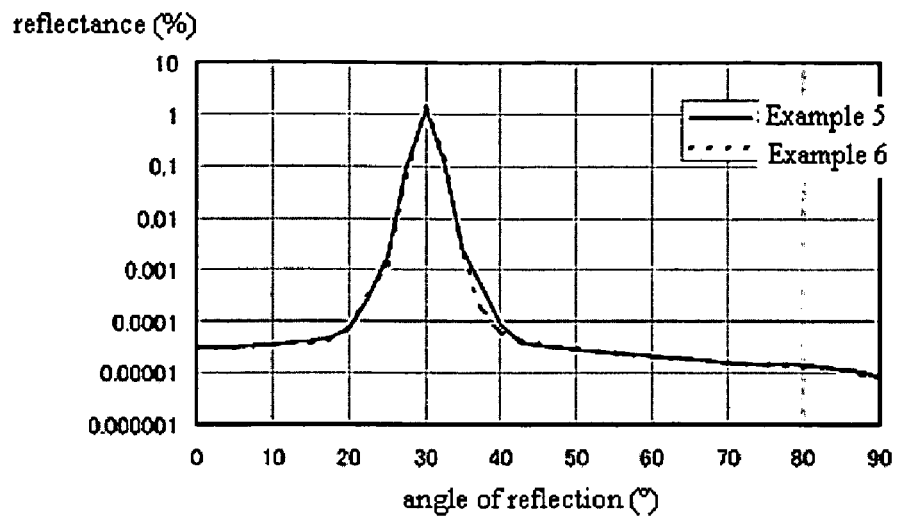
FIG. 14 is a graph showing the reflection profile of antiglare films obtained in Examples 5 and 6.
Figure 15:
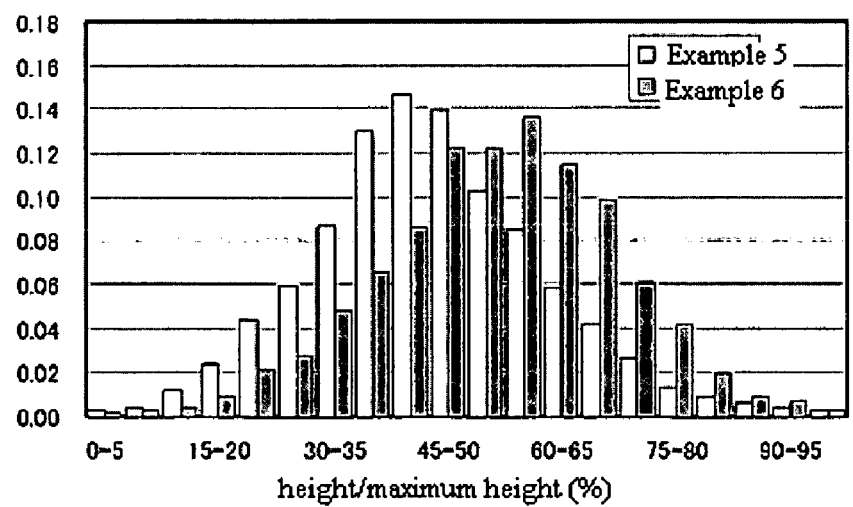
FIG. 15 is a histogram of height of antiglare films obtained in Examples 5 and 6.

Metal molds with various plating thickness having unevenness on the surface as shown in Table 1, and with other factors being the same as in Example 1, were fabricated. Transparent antiglare films, which are multilayer bodies made of a cured resin having unevenness on the surface and a TAC film, were fabricated in the same manner as in Example 1, using the respective molds. Optical properties of the gained antiglare films are shown in Table 1, and the results of the evaluation of the form of the uneven surface and the antiglare performance are shown in Table 2, respectively. In addition, as for Example 2, a graph of the reflection profile is shown in FIG. 10 together with the results of Example 1, and the histogram of height is shown in FIG. 11 together with the results of Example 1, respectively. As for Examples 3 and 4, the graphs of the respective reflection profiles are shown in FIG. 12, and the histograms of height are shown in FIG. 13, respectively, and in addition, as for Examples 5 and 6, the graphs of the respective reflection profiles are shown in FIG. 14, and the histograms of height are shown in FIG. 15, respectively.

TABLE 1

| | conditions for fabricating mold | | optical properties | | | | | |
|---|---|---|---|---|---|---|---|---|
| | | | | | | reflection profile | | |
| | pressure for blasting | plating thickness | surface haze | transmitting clarity | reflecting clarity | R(30) | R(40) | R(60)/R(30) |
| Example 1 | 0.1 MPa | 17.2 μm | 3.4% | 110.0% | 21.1% | 0.332% | 0.00272% | 0.00010 |
| Example 2 | 0.1 MPa | 11.5 μm | 0.8% | 207.4% | 28.4% | 0.606% | 0.00039% | 0.00005 |
| Example 3 | 0.1 MPa | 14.7 μm | 2.3% | 167.4% | 14.4% | 0.290% | 0.00135% | 0.00013 |
| Example 4 | 0.1 MPa | 11.8 μm | 2.3% | 126.3% | 17.9% | 0.125% | 0.00221% | 0.00016 |
| Example 5 | 0.1 MPa | 15.7 μm | 0.2% | 203.4% | 29.3% | 1.275% | 0.00009% | 0.00002 |
| Example 6 | 0.1 MPa | 18.0 μm | 0.2% | 223.1% | 36.3% | 1.494% | 0.00006% | 0.00001 |

TABLE 2

| | surface form | | | | | antiglare performance | | |
|---|---|---|---|---|---|---|---|---|
| | number of protrusions | peak location in histogram of height | arithmetic average height Pa | maximum height in cross section Pt | average area of Voronoi polygons | reflection | glare | discoloring to white |
| Example 1 | 102 | 45-50% | 0.131 μm | 0.783 μm | 370 μm$^2$ | none | 3 | none |
| Example 2 | 81 | 45-50% | 0.100 μm | 0.660 μm | 441 μm$^2$ | none | 3 | none |
| Example 3 | 116 | 45-50% | 0.132 μm | 0.771 μm | 321 μm$^2$ | none | 3 | none |
| Example 4 | 98 | 40-45% | 0.127 μm | 0.688 μm | 370 μm$^2$ | none | 3 | none |
| Example 5 | 50 | 40-45% | 0.089 μm | 0.457 μm | 847 μm$^2$ | none | 3 | none |
| Example 6 | 87 | 55-60% | 0.084 μm | 0.457 μm | 484 μm$^2$ | none | 3 | none |

As shown in Tables 1 and 2, the samples, of which the reflection profile and the surface form satisfy the definition of the present invention, exhibited excellent antiglare performance (no reflection). In addition, the degree of glare and discoloring to white was also low.

Comparative Examples 1 to 6

Figure 16:
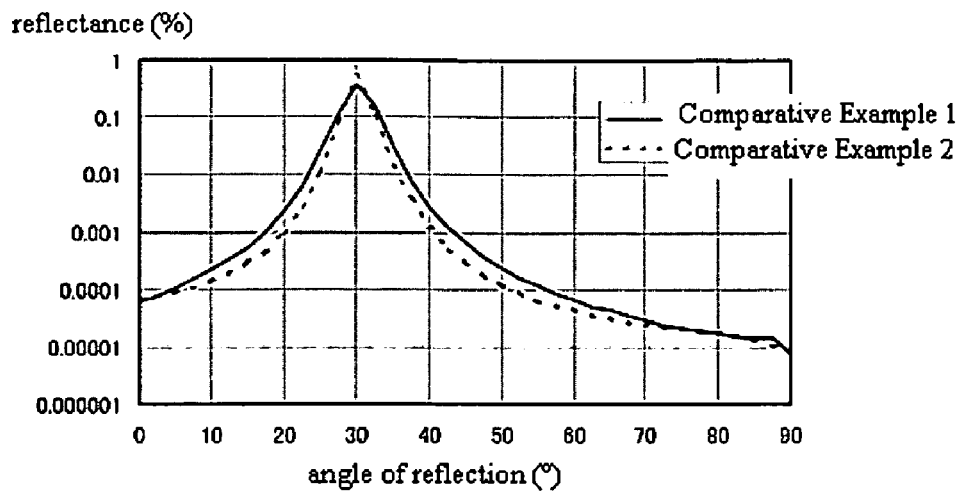
FIG. 16 is a graph showing the reflection profile of antiglare films of Comparative Examples 1 and 2.
Figure 17:
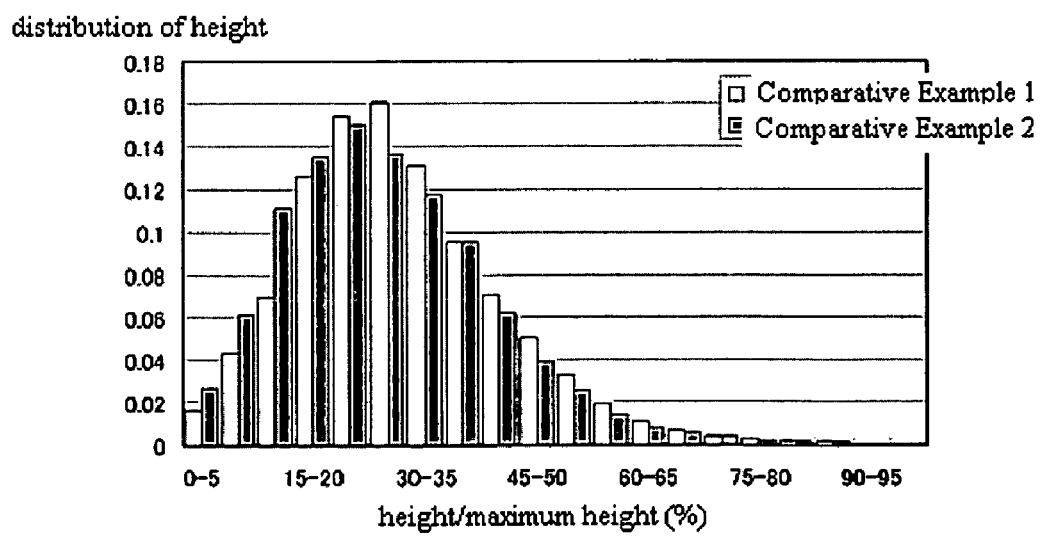
FIG. 17 is a graph showing the histogram of height of antiglare films of Comparative Examples 1 and 2.
Figure 18:
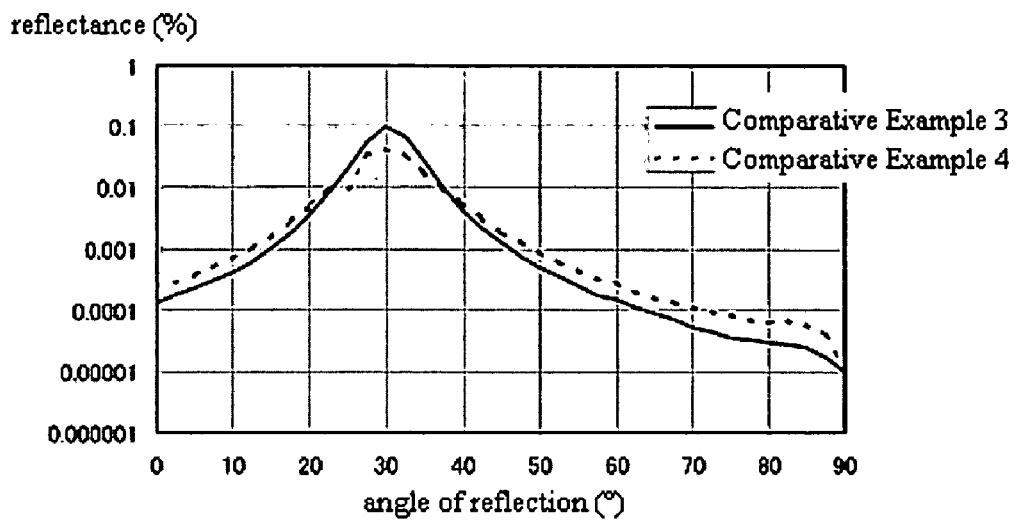
FIG. 18 is a graph showing the reflection profile of antiglare films of Comparative Examples 3 and 4.
Figure 19:
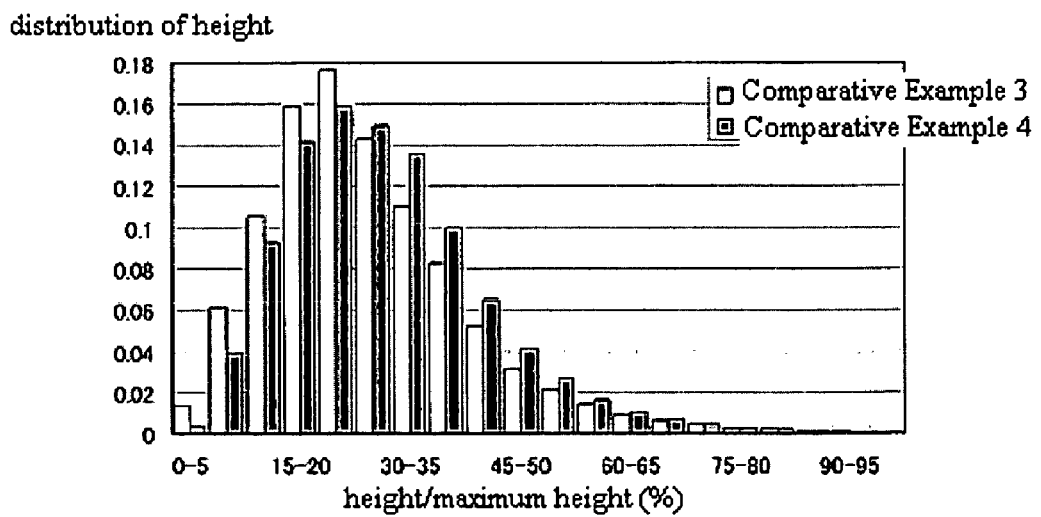
FIG. 19 is a graph showing the histogram of height of antiglare films of Comparative Examples 3 and 4.
Figure 20:
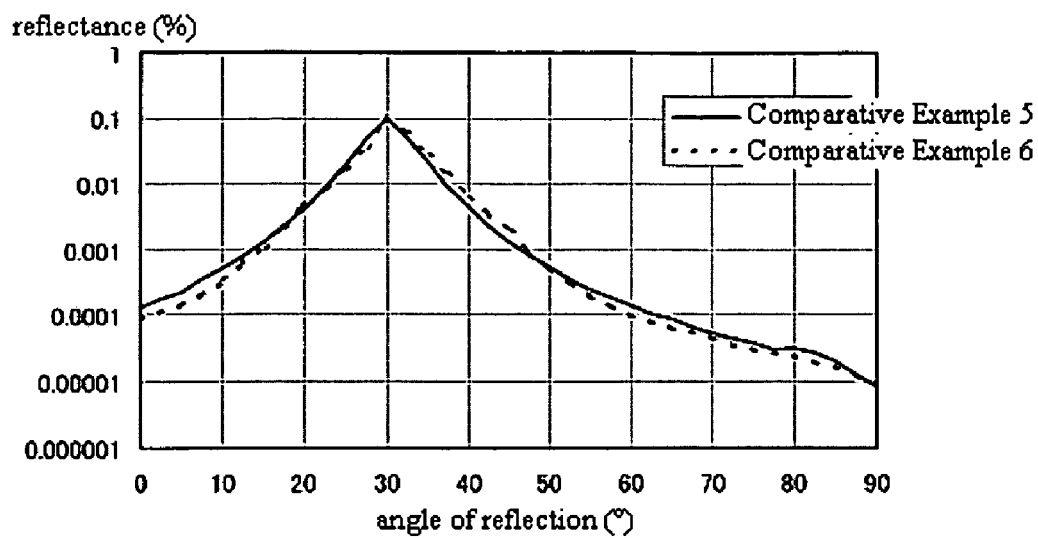
FIG. 20 is a graph showing the reflection profile of antiglare films of Comparative Examples 5 and 6.
Figure 21:
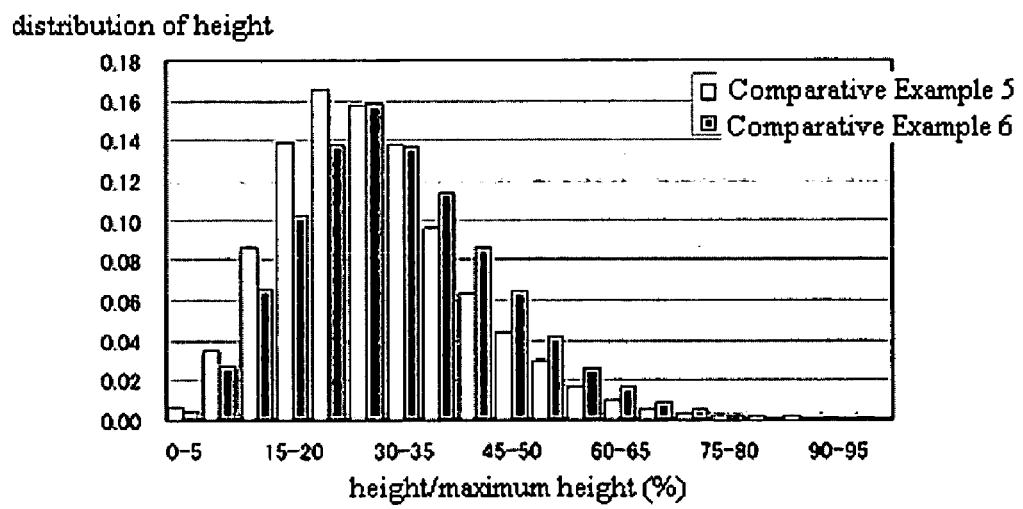
FIG. 21 is a graph showing the histogram of height of antiglare films of Comparative Examples 5 and 6.

As comparative examples, the optical properties of antiglare films "AG1," "AG3," "AG5," "AG6," "AG8" and "GL6" (which are respectively referred to as Comparative Examples 1 to 6), which are used as an antiglare film in a polarizing plate "Sumikaran", sold by Sumitomo Chemical Co., Ltd., and where a filler is dispersed in an ultraviolet ray curing resin, are shown in Table 3, and the results of the evaluation of the form of the uneven surface and the antiglare performance are shown in Table 4. As for Comparative Examples 1 and 2, the graphs of the respective reflection profiles are shown in FIG. 16, and the histograms of height are shown in FIG. 17, respectively. In addition, as for Comparative Examples 3 and 4, the graphs of the respective reflection profiles are shown in FIG. 18, and the histograms of height are shown in FIG. 19, respectively. Furthermore, as for Comparative Examples 5 and 6, the graphs of the respective reflection profiles are shown in FIG. 20, and the histograms of height are shown in FIG. 21, respectively.

TABLE 3

| | optical properties | | | | | |
|---|---|---|---|---|---|---|
| | | | | reflection profile | | |
| | surface haze | transmitting clarity | reflecting clarity | R(30) | R(40) | R(60)/R(30) |
| Comparative Example 1 | 3.6% | 52.1% | 15.7% | 0.368% | 0.00259% | 0.00018 |
| Comparative Example 2 | 3.4% | 97.1% | 20.1% | 0.568% | 0.00113% | 0.00008 |
| Comparative Example 3 | 10.7% | 65.9% | 23.2% | 0.110% | 0.00409% | 0.00145 |
| Comparative Example 4 | 20.1% | 40.9% | 21.7% | 0.042% | 0.00582% | 0.00639 |
| Comparative Example 5 | 10.9% | 199.8% | 30.3% | 0.099% | 0.00452% | 0.00148 |
| Comparative Example 6 | 10.9% | 58.2% | 15.5% | 0.102% | 0.00671% | 0.00099 |

TABLE 4

| | surface form | | | | | antiglare performance | | |
|---|---|---|---|---|---|---|---|---|
| | | peak | | maximum | average | | | |
| | number of protrusions | location in histogram of height | arithmetic average height Pa | height in cross section Pt | area of Voronoi polygons | reflection | glare | discoloring to white |
| Comparative Example 1 | 18 | 25-30% | 0.184 μm | 0.933 μm | 2,084 μm² | none | 5 | none |
| Comparative Example 2 | 22 | 20-25% | 0.220 μm | 1.088 μm | 1,762 μm² | exists | 5 | none |
| Comparative Example 3 | 78 | 20-25% | 0.190 μm | 1.107 μm | 546 μm² | none | 3 | exists |
| Comparative Example 4 | 114 | 20-25% | 0.284 μm | 1.615 μm | 384 μm² | none | 5 | exists |
| Comparative Example 5 | 139 | 20-25% | 0.157 μm | 0.865 μm | 345 μm² | none | 3 | exists |
| Comparative Example 6 | 146 | 25-30% | 0.196 μm | 1.061 μm | 297 μm² | none | 2 | exists |

As shown in Tables 3 and 4, in Comparative Examples 1 and 2, R (30) is not more than 2%, and R (40) is not more than 0.003%, and therefore, no discoloring to white is observed. However, the number of protrusions within a region of 200 μm×200 μm is less than 50, the peak location in the histogram exists in a location of 20% to 30%, the arithmetic average height Pa exceeds 0.15 μm, the maximum height in a cross section Pt exceeds 0.9 μm and the average area of the Voronoi polygons exceeds 1000 μm². As a result, no sufficient antiglare performance (no reflection) can be achieved, or glare occurs. Meanwhile, in Comparative Examples 3 to 6, R (40) exceeds 0.003%, and therefore, these comparative examples look discolored to white in comparison with examples of the present invention. In addition, the surface haze is high, and thus, there is a tendency that the front contrast lowers. In addition to this, the peak location of the histogram of height is polarized, the arithmetic average height Pa exceeds 0.15 μm and the maximum height in a cross section Pt exceeds 0.9 μm in some comparative examples, and therefore, the performance thereof is equal to or lower than examples of the present invention in terms of glare.

Comparative Example 7

The surface of an aluminum plate (A6061 according to JIS), which is 50 mm, was polished to a mirror surface, and after that, zirconia beads "TZ-B53" (trademark, having an average grain diameter of 53 μm), made by Tosoh Corporation were blasted onto one surface of this aluminum plate polished into a mirror surface, under a pressure for blasting at 0.4 MPa, and an electroless gloss nickel plating process was carried out on the gained uneven aluminum plate, and thus, a metal mold was fabricated. Separately, an application liquid which included a photo-curing resin composite and a photo polymerization initiator, and was prepared in the same manner as in Example 1, was applied to a triacetyl cellulose (TAC) film having a thickness of 80 μm so that the thickness after being dried became 5 μm, and then, was dried for 3 minutes in a drier of which the temperature was set at 60° C. The film after being dried was made to make contact with and was pressed against the uneven surface of the above described metal mold with a rubber roll so that the photo-curing resin composite layer was placed on the nickel plating layer side, and in this state, the TAC film side was irradiated with light from a high pressure mercury lamp with an intensity of 20 mW/cm² where the amount of light was 200 mJ/cm² when light was converted to h lines through calculations, and thus, the photo-curing resin composite layer was cured. After this, the TAC film was removed from the mold together with the cured resin, and thus, a transparent antiglare film, which was a multilayer body made of a cured resin having unevenness on the surface and a TAC film, was fabricated. Though the thus gained antiglare film had a low haze and excellent antiglare performance, the degree of glare was level 5, and the glare was conspicuous due to the small number of protrusions per unit area in comparison with the examples.

An antiglare film of the present invention is placed on any of a variety of displays, such as a liquid crystal panel, a plasma display panel, a Braun tube (cathode ray tube: CRT) display or an organic electroluminescence (EL) display, so that this antiglare film is on the visible side relative to the image displaying element, and thereby, discoloring to white and glare can be prevented from occurring, the reflected image can be faded and excellent visibility can be provided.

An antiglare film of the present invention has excellent antiglare performance, so that haze is low, glaring and reflection can be suppressed, and discoloring to white can be kept low while maintaining the brightness of the display image. In addition, an image display where an antiglare film of the present invention is placed is excellent in terms of brightness, antiglare performance and visibility.

What is claimed is:

1. An antiglare film having microscopic unevenness created on a surface, wherein reflectance R (30) at a reflection angle of 30° for light entering at an incident angle of 30° is not more than 2%, and reflectance R (40) at a reflection angle of 40° is not more than 0.003%, and
    protrusions of from 50 to 150 are provided within a region of 200 μm×200 μm.

2. The antiglare film according to claim 1, wherein the value of R (60 or more)/R (30) is not more than 0.001 when the reflectance in an arbitrary direction at a reflection angle of not less than 60° for light that enters at an incident angle of 30° is defined as R (60 or more).

3. The antiglare film according to claim 1, wherein the surface haze for vertical incident light is not more than 5%.

4. The antiglare film according to claim 1, wherein the sum of the clarity of reflection measured at an incident angle of light of 45° using three types of optical combs where the width in dark portions and bright portions is 0.5 mm, 1.0 mm and 2.0 mm is not more than 50%.

5. The antiglare film according to claim 1, wherein the outermost surface of the antiglare film is free from a film having low reflection.

6. The antiglare film according to claim 1, wherein a film having low reflection is on the outermost surface of the antiglare film.

7. An image display comprising an antiglare film according to claim 1 and an image displaying element, wherein the antiglare film is placed on the visible side of the image displaying element.

* * * * *